United States Patent [19]

Mori et al.

[11] Patent Number: 5,134,609
[45] Date of Patent: Jul. 28, 1992

[54] DROP/INSERT CHANNEL SELECTING SYSTEM

[75] Inventors: Masakazu Mori, Nagoya; Masanori Arai, Kawasaki; Kazuo Takatsu, Kawaguchi; Naonobu Fujimoto, Yokohama; Nobuhide Yamaguchi, Kawasaki, all of Japan

[73] Assignee: Fujitsu Limited, Kawasaki, Japan

[21] Appl. No.: 474,103

[22] PCT Filed: Aug. 25, 1989

[86] PCT No.: PCT/JP89/00870

§ 371 Date: Apr. 26, 1990

§ 102(e) Date: Apr. 26, 1990

[87] PCT Pub. No.: WO90/02454

PCT Pub. Date: Mar. 8, 1990

[30] Foreign Application Priority Data

Aug. 26, 1988 [JP] Japan .................. 63-213163
Aug. 30, 1988 [JP] Japan .................. 63-216713
Sep. 14, 1988 [JP] Japan .................. 63-230705

[51] Int. Cl.⁵ .................................... H04J 3/08
[52] U.S. Cl. ............................. 370/55; 370/105.1
[58] Field of Search ............ 370/55, 60, 58.1, 110.4, 370/4, 105.1

[56] References Cited

U.S. PATENT DOCUMENTS

| | | | |
|---|---|---|---|
| 4,598,399 | 7/1986 | Bath | 370/55 |
| 4,670,626 | 6/1987 | Fisher et al. | |
| 4,967,411 | 10/1990 | Grover | 370/110.4 |
| 5,018,135 | 5/1991 | Ashi et al. | 370/55 |

FOREIGN PATENT DOCUMENTS 0184221 6/1986 European Pat. Off. .

OTHER PUBLICATIONS

IEEE Global Telecommunications Conference, 2-5 Dec. 1985, New Orleans (US), IEEE, R. J. Boehm et al.: "SONET (Synchronous Optical Network", pp. 46.8.1-46.8.8, see p. 46.8.3, paragraph 5; p. 46.8.6, paragraph 8.2.

IEEE Global Telecommunications Conference, 1-4 Dec. 1986, Houston (US), IEEE, M. W. Harvery et al.: "Network Planning for the Syntran Add/Drop Multiplex (ADM)", pp. 45.3.1-45.3.5, see p. 45.3.2, right-hand column.

IEEE Journal of Solid State Circuits, vol. 23, No. 1, Feb. 1988, IEEE, (New York, US), H. J. Chao et al.: "A 140 Mbit/s CMOS LSI Framer Chip for a Broad-Band ISDN Local Access System", pp. 133-141, see p. 133, left-hand column, lines 16-25; p. 133. right-hand column, line 7-p. 135, right-hand column, line 19.

Primary Examiner—Douglas W. Olms
Assistant Examiner—Min Jung
Attorney, Agent, or Firm—Staas & Halsey

[57] ABSTRACT

A drop/insert selecting system for an optical transmission system has a decreased circuit scale, by providing a switching unit (4,4') having a plurality of input terminals for receiving a plurality of input channels and a plurality of output terminals, each of the input channels conveying a frame synchronization signal and a channel number. At at least one drop/insert unit (51,52,51',52') is provided for sequentially generating channel preselection signals until a frame synchronization is established and for dropping or inserting necessary signals from or into a corresponding one of the necessary channels incorporated into the drop/insert units when a frame synchronization is established. A channel selecting unit (6,6a,6b) is provided for generating a plurality of channel selecting signals in response to each of the channel preselection signals, each of the channel selecting signals functioning to connect each of the output terminals to one of the plurality of input terminals. The remaining output terminals of the switching unit are connected to through-channels to which no drop/insert units are connected.

27 Claims, 14 Drawing Sheets

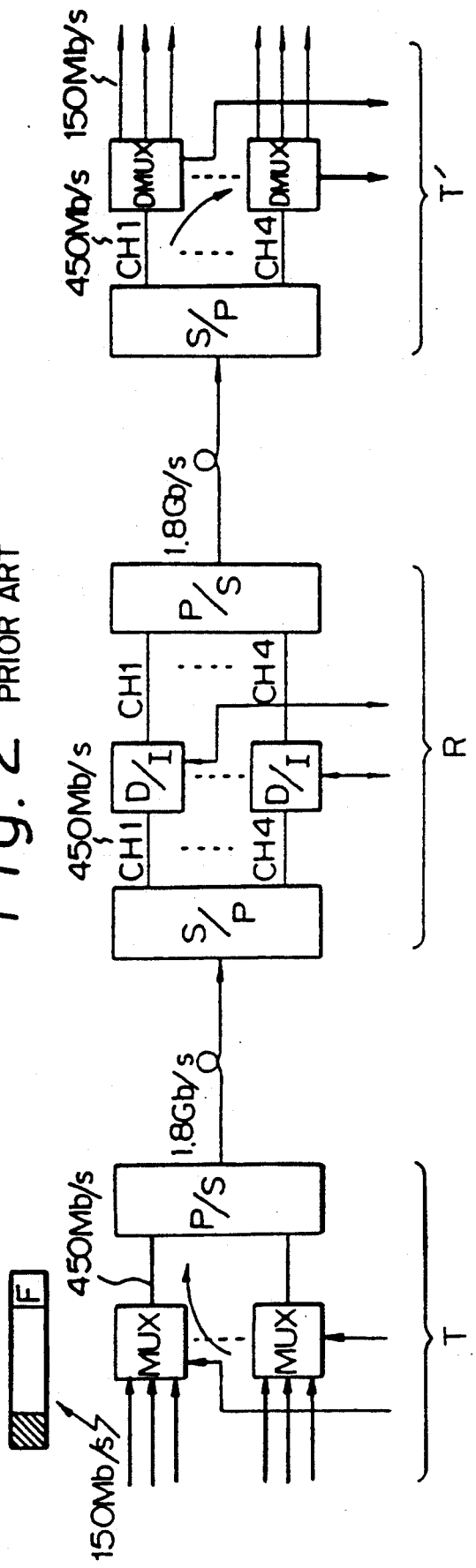
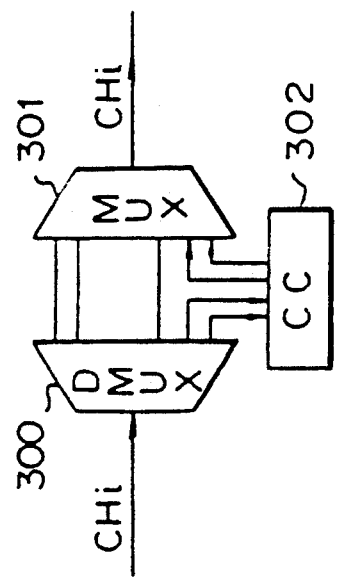

Fig. 8

| D/I | * | | | | * | | | | * | | | | * | | | * |
|---|---|---|---|---|---|---|---|---|---|---|---|---|---|---|---|---|
| CH 1 SEL1(a1', b1') | 00 | 00 | 00 | 00 | 01 | 01 | 01 | 01 | 10 | 10 | 10 | 10 | 11 | 11 | 11 | 11 |
| CH 2 SEL2(a2', b2') | 00 | 01 | 10 | 11 | 00 | 01 | 10 | 11 | 00 | 01 | 10 | 11 | 00 | 01 | 10 | 11 |
| THROUGH | | | | | | | | | | | | | | | | |
| CH 3 SEL3(a3', b3') = ($\overline{a1}$, $\overline{b2}$) | 11 | 10 | 10 | 10 | 11 | 10 | 10 | 10 | 01 | 00 | 00 | 00 | 01 | 00 | 00 | 00 |
| CH 4 SEL4(a4', b4') = ($\overline{a2}$, $\overline{b1}$) | 11 | 11 | 01 | 01 | 10 | 10 | 00 | 00 | 11 | 11 | 01 | 01 | 10 | 10 | 00 | 00 |

DROP/INSERT CHANNEL SELECTING SYSTEM

TECHNICAL FIELD

The present invention relates to a drop/insert channel selecting system in an optical transmission system in which an orderwire signal or a supervisory and control signal is dropped or inserted.

BACKGROUND ART

In an optical transmission system, to transmit an orderwire signal or a supervisory and control signal, it is advantageous, in view of effective utilization of an optical fiber, to superimpose these subsignals on a main signal passing through the optical fiber.

These subsignals are usually transmitted to or received from a line terminating equipment.

In recent years, however, accompanied by the developments in large capacity optical transmission systems, requirements have increased to drop or insert the subsignals at any desired repeater such as in a regenerator or, in other words, an intermediate repeater arranged between line terminal equipments. Such an intermediate repeater having a drop/insert function is referred to in this specification as a D/I repeater. When a D/I repeater is provided, then, between these D/I repeaters, or between the line terminal equipment and the D/I repeater, subsignals such as the orderwire signal or the supervisory and control signal can be transmitted and received through two or more specified channels. These subsignals are required to be dropped or inserted at a desired D/I repeater.

In the conventional intermediate repeaters, drop/insert units for dropping or inserting necessary signals are provided for all channels regardless of whether or not the signals on the channels need not be dropped or inserted. In the intermediate repeaters, however, there are signals such as communication data which need not be dropped or inserted from or into channels. Hereinafter these signals which need not be dropped or inserted are referred to as through channel signals. Therefore, there is a problem in that the number of the drop/insert units (hereinafter also referred to as D/I units) in a conventional intermediate repeater is so large that the circuit scale of the conventional intermediate repeater is large.

In particular, for high-speed data, since it is difficult to directly drop or insert subsignals from or into high-speed data, the high-speed data is usually converted into a plurality of low-speed data channels of for example 400 Mb/s by a serial-parallel conversion, and the subsignals are dropped or inserted from or into one of the parallel channels. In this case, a suitable channel selecting circuit has to be developed.

If a limited number of drop/insert units are provided to correspond to only the necessary channels other than the through-channels, the circuit for selecting the through-channels must be as simple as possible. However, conventional circuits for selecting these through-channels are very complex. Namely, these circuits are formed by a random logic circuit constructed of 20 to 30 integrated circuits (IC's) so that the circuit scale becomes large and is opposite to the requirement to construct a D/I repeater as simple as possible.

From another point of view, if the intermediate repeater has the drop/insert function, the constitution thereof becomes similar to that of the line terminal equipment so that these repeaters can be manufactured with the same design. Conventionally, however, the line terminal equipment and the intermediate repeater are manufactured with different system designs. The different system designs cause disadvantages in high manufacturing cost, in complex control of the repeaters, and in preparing different kinds of spare repeaters for accidental faults.

DISCLOSURE OF THE INVENTION

The present invention is created in view of these circumstances and has an object to provide a D/I repeater in which the number of drop/insert units is reduced.

Another object of the present invention is to provide a D/I repeater which has a very simple channel selecting circuit for selecting through-channel signals.

Still another object of the present invention is to provide a D/I repeater which has a similar circuit configuration to a line terminal equipment.

To attain the above objects, there is provided, according to the present invention, a drop/insert selecting system for dropping or inserting necessary signals from or into necessary channels. The system comprises a switching unit having a plurality of input terminals for receiving a plurality of input channels and a plurality of output terminals. Each of the input channels conveys a frame synchronization signal and a channel number. At least one drop/insert unit is provided, each operatively connected to one of the output terminals of the switching unit, for sequentially generating channel preselection signals until a frame synchronization is established, and for dropping or inserting necessary signals from or into a corresponding one of the necessary channels incorporated into the drop/insert unit when a frame synchronization is established. A channel selecting unit is further provided, operatively connected to the switching unit and to the at least one drop/insert unit, for generating a plurality of channel selecting signals in response to each of the channel preselection signals, each of the channel selecting signals functioning to connect each of the output terminals to one of the plurality of input terminals. The remaining output terminals of the switching unit are connected to through-channels to which no drop/insert unit is connected.

According to one aspect of the present invention, the plurality of input terminals comprise a first, a second, a third and a fourth input terminals. The plurality of output terminals comprise a first, a second, a third and a fourth output terminals. The at least one drop/insert unit comprises a first and a second drop/insert units, operatively connected to the first and the second output terminals, respectively. The through-channels comprises a first and a second through-channels, operatively connected to the third and the fourth output terminals, respectively.

Each of the drop/insert units comprises a frame synchronization detecting unit, operatively connected to a corresponding one of the output terminals, for detecting an out of frame synchronization state in the channel output from the corresponding output terminal; a comparing unit, operatively connected to corresponding one of the output terminals, for detecting a non-coincidence between the channel number in the channel output from said corresponding output terminal and a previously stored channel number indicating the channel from which or into which signals are to be dropped or to be inserted; and a preselecting signal generating unit, operatively connected to the frame synchronization detecting unit and the comparing unit, for generating a two-bit preselecting signal for selecting one of the input terminals to be connected to the output terminal connected to the drop/insert unit under consideration, the two-bit reselecting signal being changed with a predetermined period until both of the out of frame and the non-coincidence signals disappear.

The system further comprises an out of frame protection circuit, operatively connected to the frame synchronization detecting unit, for effecting a front and a rear protection on the out of frame signal from the frame synchronization detecting unit; a non-coincidence signal protection circuit, operatively connected to the comparing unit, for effecting a front and a rear protection of the non-coincidence signal from the comparing unit; and a reframe protection circuit, operatively connected between the outputs of the out of frame protection circuit and the switching unit, and between the output of the non-coincidence signal protection circuit and the switching unit, for effecting a rear protection of the signal output from the out of frame protection circuit or the non-coincidence signal protection circuit.

The preselecting signal generating unit comprises: a clock signal generating unit for generating a clock signal; and a frequency dividing unit, operatively connected to the clock signal generating unit, to the frame synchronization detecting unit, and to the comparing unit, for generating the two-bit preselecting signal in response to the clock signal until both of the out of frame signal ad the non-coincidence signal disappear.

The system further comprises: a counter unit, operatively connected to the frequency dividing unit, for counting at least the maximum average reframing time from the detection of an out of frame synchronization state.

According to still another aspect of the present invention, the channel selecting unit comprises: two pair of lines, operatively connected to the first and the second drop/insert units, for directly passing the two channel preselection signals output from the first and the second drop/insert units, to the switching unit, as a first and a second channel selecting signals for selecting one of the input terminals to be connected to the first output terminal and another one of the input terminals to be connected to the second output terminal, respectively; a first NOT gate for inverting the first bit in the first channel preselection signal to output a first bit of a third channel selecting signal for selecting one of the input terminals to be connected to the third output terminal; a second NOT gate for inverting the second bit in the first channel preselection signal to output a second bit of a fourth channel selecting signal for selecting one of the input terminals to be connected to the fourth output terminal; a third NOT gate for inverting the first bit in the second channel preselection signal to output a first bit of the fourth channel selecting signal for selecting one of the input terminals to be connected to the fourth output terminal; and a fourth NOT gate for inverting the second bit in the second channel preselection signal to output a second bit of the third channel selecting signal for selecting one of the input terminals to be connected to the third output terminal.

According to a further aspect of the present invention, the plurality of input terminals comprise a first, a second, a third and a fourth input terminals; the plurality of output terminals comprise a first, a second, a third and a fourth output terminals; the at least one drop/insert unit comprise a first, a second, a third, and a fourth drop/insert units, operatively connected to the first, the second, the third, and the fourth output terminals, respectively; the third and the fourth drop/insert units being optionally plugged in the drop/insert system; and the third and the fourth drop/insert units providing detecting signals (DT), indicating that the third and the fourth drop/insert units are plugged in, to the channel selecting unit when plugged into the drop/insert system.

According to still further aspect of the present invention, the plurality of input terminals comprise a first, a second, a third and a fourth input terminals; the plurality of output terminals comprise a first, a second, a third and a fourth output terminals; the at least one drop/insert unit comprise a first, a second, a third, and a fourth drop/insert units, optionally plugged in the drop/insert system, and operatively connected to the first, the second, the third, and the fourth output terminals, respectively when plugged into the drop/insert unit; the first, the second, the third and the fourth drop/insert units providing detecting signals to the channel selecting unit when plugged into the drop/insert system.

According to still further aspect of the present invention, the channel selecting unit comprises: a first NOT gate for inverting the first bit in the first channel preselection signal; a second NOT gate for inverting the second bit in the first channel preselection signal; a third NOT gate for inverting the first bit in the second channel preselection signal; a fourth NOT gate for inverting the second bit in the second channel preselection signal; a fifth NOT gate for inverting the first bit in the third channel preselection signal; a sixth NOT gate for inverting the second bit in the third channel preselection signal; a seventh NOT gate for inverting the first bit in the fourth channel preselection signal; an eighth NOT gate for inverting the second bit in the fourth channel preselection signal; a first gate circuit having a first input connected to the output of the first NOT gate and a second input connected to a first bit in the third channel preselection signal, for outputting, as a first bit in the third channel selection signals, either the first bit in the third channel preselection signal or the output of the first NOT gate, depending on whether the third drop/insert unit is plugged in or is not plugged in the drop/insert system respectively; a second gate circuit having a first input connected to the output of the fourth NOT gate and a second input connected to a second bit in the third channel preselection signal, for outputting, as a second bit in the third channel selection signal, either the second bit in the third channel preselection signal or the output of the fourth NOT gate, depending on whether the third drop/insert unit is plugged in or is not plugged in the drop/insert system respectively; a third gate circuit having a first input connected to the output of the third NOT gate and a second input connected to a first bit in the fourth channel preselection signal, for outputting, as a first bit in the forty channel selection signal, either the first bit in the fourth channel preselection signal or the output of the third NOT gate, depending on whether the fourth drop/insert unit is plugged in or is not plugged in the drop/insert system respectively; a fourth gate circuit having a first input connected to the output of the second NOT gate and a second input connected to a second bit in the fourth channel preselection signal, for outputting, as a second bit in the fourth channel selection signal, either the second bit in the fourth channel preselection signal or the output of the second NOT gate, depending on whether the fourth drop/insert unit is plugged in or is not plugged in the drop/insert system respectively; a fifth gate circuit having a first input connected to the output of the fifth NOT gate and a second input connected to a first bit in the first channel preselection signal, for outputting, as a first bit in the first channel selection signal, either the first bit in the first channel preselection signal or the output of the fifth NOT gate, depending on whether the first drop/insert unit is plugged in or is not plugged in the drop/insert system respectively; a sixth gate circuit having a first input connected to the output of the sixth NOT gate and a second input connected to a second bit i the first channel preselection signal, for outputting, as a second bit in the first channel selection signal, either the second bit in the first channel preselection signal or the output of the sixth NOT gate, depending on whether the second drop/insert unit is plugged in or is not plugged in the drop/insert system respectively; a seventh gate circuit having a first input connected to the output of the seventh NOT gate and a second input connected to a first bit in the second channel preselection signal, for outputting, as a first bit in the second channel selection signal, either the first bit in the second channel preselection signal or the output of the seventh NOT gate, depending on whether the third drop/insert unit is plugged in or is not plugged in the drop/insert system respectively; an eighth gate circuit having a first input connected to the output of the sixth NOT gate and a second input connected to a second bit in the second channel preselection signal, for outputting, as a second bit in the second channel selection signal, either the second bit in the second channel preselection signal or the output of the sixth NOT gate, depending on whether the fourth drop/insert unit is plugged in or is not plugged in the drop/insert system respectively; the outputs of the fifth and the sixth gate circuits being the first channel selecting signal for selecting one of the input terminals of the switching unit to be connected to the first output terminal of the switching unit; the outputs of the seventh and the eighth gate circuits being the second channel selecting signal for selecting one of the input terminals of the switching unit to be connected to the second output terminal of the switching unit; the outputs of the first and the second gate circuits being the third channel selecting signal for selecting one of the input terminals of the switching unit to be connected to the third output terminal of the switching unit; the outputs of the third and the fourth gate circuits being a fourth channel selecting signal for selecting one of the input terminals of the switching unit to be connected to the fourth output terminal of the switching unit.

According to still further aspect of the present invention, the switching unit comprises a first, a second, a third, and a fourth switching parts arranged to correspond to the first drop/insert unit, the second drop/insert unit, the first through-channel, and the second through-channel, respectively; each of the switching parts having the plurality of input terminals and one of the output terminals connected to the corresponding one of the first drop/insert unit, the second drop/insert unit, the first through-channel, and the second through-channel; the third switching part and the fourth switching part having unit to fix, when the first or the second drop/insert unit is in an out of frame, their switching positions as the through channels. In this aspect, the third drop/insert unit and the fourth drop/insert unit are unplugged; the switching unit comprises a first, a second, a third, and a fourth switching parts arranged to correspond to the first drop/insert unit, the second drop/insert unit, the first through-channel, and the second through-channel, respectively; each of the switching parts having the plurality of input terminals and one of the output terminals connected to the corresponding one of the first drop/insert unit, the second drop/insert unit, the first through-channel, and the second through-channel; the third switching part and the fourth switching part having unit to fix, when the first or the second drop/insert unit is in an out of frame synchronization state, their switching positions as the through channels.

BRIEF DESCRIPTION OF DRAWINGS

The above objects and features of the present invention will be more apparent from the following description of the preferred embodiments with reference to the accompanying drawings, wherein:

FIG. 2 is a block diagram showing a conventional optical transmission system;

FIG. 3 is a block diagram showing a general construction of one of drop/insert circuits D/I shown in FIG. 2;

FIG. 8 is a diagram showing the combinations of the channel selecting signals output from the D/I units shown in FIG. 6;

BEST MODE FOR CARRYING OUT THE INVENTION

Figure 1:
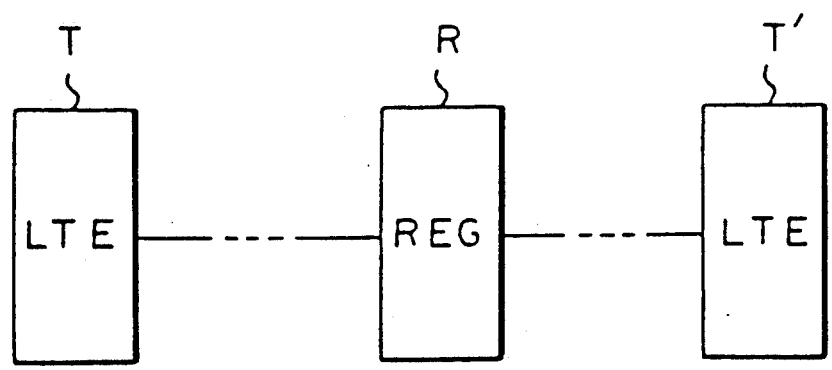
FIG. 1 is a block diagram showing an optical transmission system for explaining the background of the present invention.

Throughout the specification and the accompanying drawings, the same reference numerals or the same reference symbols represent the same or corresponding parts.

FIG. 1 is a block diagram showing an optical transmission system as a background of the present invention. In the optical transmission system shown in FIG. 1, there are a plurality of regenerators (REG) R between line terminating equipments (LTE) T and T'. The regenerators are referred to in this specification as intermediate repeaters. Each of the intermediate repeaters also has a drop/insert function. Therefore, the intermediate repeaters are also referred to as D/I repeaters. Between these D/I repeaters, or between the line terminal equipment T or T' and a D/I repeater, orderwire signals or supervisory and control signals are transmitted and received.

The general construction of the conventional line terminal equipments T and T' and the conventional intermediate repeater R are shown in FIG. 2. In the figure, the transmitting line terminal equipment T includes a plurality of multiplexers MUX each for multiplexing three 150 Mb/s signals into a 450 Mb/s signal, and a parallel-serial converter P/S for converting the four 450 Mb/s parallel signals into a 1.8 Gb/s serial signal. The intermediate repeater R includes a serial-parallel converter S/P for converting the 1.8 Gb/s serial signal into four channels CH1 to CH4 of 450 Mb/s parallel signals, a plurality of D/I units for dropping or inserting necessary subsignals, and a parallel-serial converter P/S for converting the four channels of 450 Mb/s parallel signals into a 1.8 l Gb/s serial signal. The line terminal equipment T' includes a serial-parallel converter S/PO for converting the 1.8 Gb/s serial signal into four channels CH1 to CH 4 of 450 Mb/s parallel signals and a plurality of demultiplexers DMUX for demultiplexing the 450 Mb/s signal into three 150 Mb/s signals.

In the transmitting line terminal equipment T, subsignals are also multiplexed with the 150 Mb/s main signals. In the receiving line terminal equipment T', subsignals are demultiplexed by the demultiplexers DMUX.

The above-mentioned number of channels and the bit rates of the signals are of course only an example.

The general construction of each D/I unit in the intermediate repeater R is shown in FIG. 3. In the figure, the D/I unit includes a demultiplexer (DMUX) 300, a multiplexer (MUX) 301, and a control circuit (CC) 302. A part of the demultiplexed signals from the demultiplexer (DMUX) 300 are dropped into the control circuit (CC) 302, while the remaining signals from the demultiplexer (DMUX) 300 are passed through and directly input to the multiplexer (MUX) 301. From the control circuit (CC) 302, inserting signals are input to the multiplexer 301.

For example, the input signal input to the demultiplexer (DMUX) 300 is a 1.8 Gb/s signal in which four channels of signals of 450 Mb/s are multiplexed. In the 1.8 Gb/s signal, subsignals are superimposed on the respective channels of 450 Mb/s signals. In such a system, subsignals passing through two or more specified channels are required to be dropped or inserted at the D/I units corresponding to the specified channels.

On the other hand, there are through-channel signals such as communication data which need not be dropped or inserted at any D/I unit. However, as shown in FIG. 2, conventionally, the D/I units are provided on the respective channels regardless of whether or not the signals are the through-channel signals. Therefore, for the through-channel signals, the D/I units connected to the channels are wasted.

Further, the circuit for selecting the through-channel signals must be as simple as possible. However, conventional circuits for selecting these through-channel signals are formed by a random logic circuit constructed of 20 to 30 integrated circuits (ICs) so that the circuit scale becomes large and is opposite to the requirement to construct by a simple D/I repeater.

Figure 4:
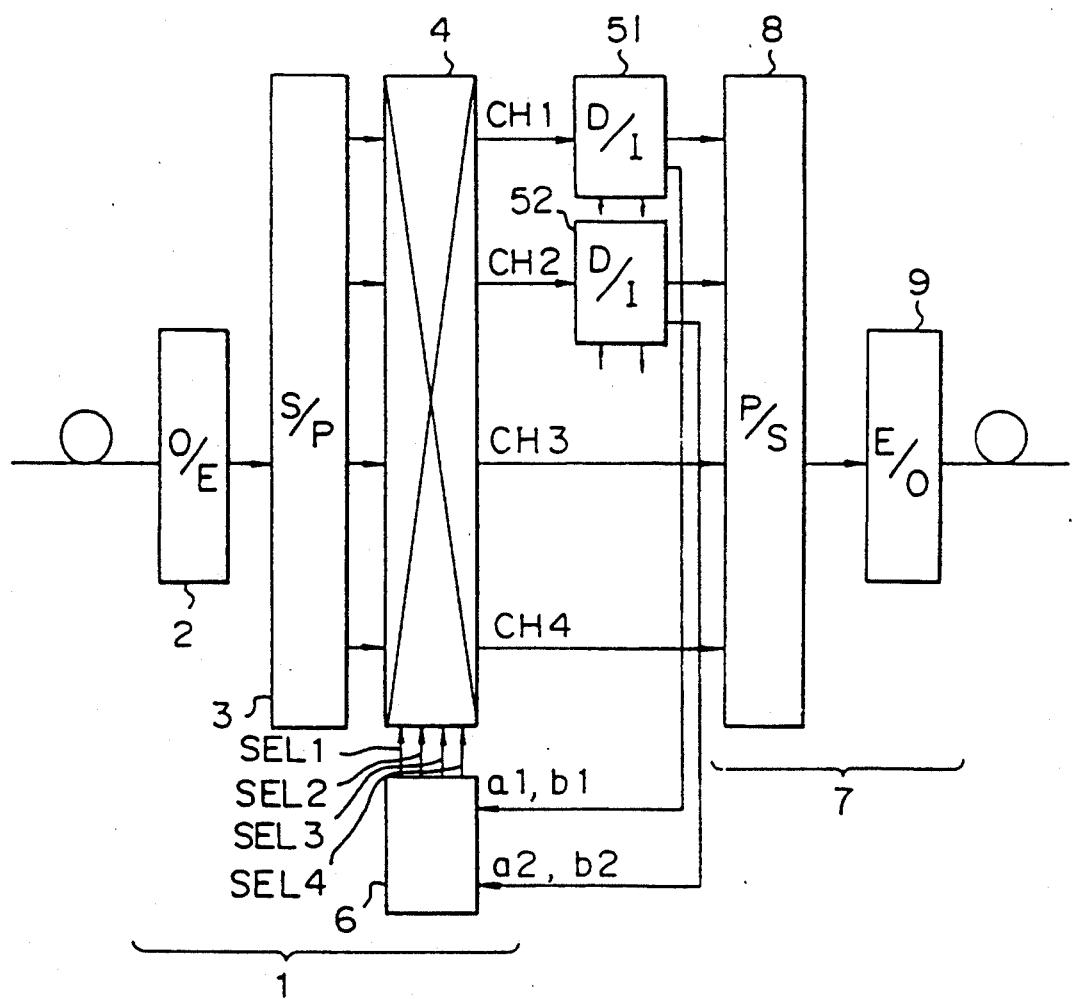
FIG. 4 is a block diagram showing an intermediate repeater according to an embodiment of the present invention.

FIG. 4 is a block diagram showing an intermediate repeater for explaining the principle of the present invention. In the figure, the intermediate repeater includes an input unit 1, i.e., an optical receiving unit, two drop/insert units (D/I) 51 and 52, and an output unit 7.

The input unit 1 includes an opto-electric converter (O/E) 2, a serial-parallel converter (S/P) 3 for converting a a1.8 Gb/s serial signal into four 450 Mb/s parallel signals, a matrix switch 4 for switching the input channels in response to channel selecting signals SEL1 to SEL4, and a channel selecting circuit 6, and a channel selecting circuit 6.

The drop/insert units (D/I) 51 and 52 have demultiplexer and a multiplexer arranged back to back as shown in FIG. 3.

The channel selecting circuit 6 receives channel preselecting signals (a1, b1) and (a2, b2) for preselecting channels to be dropped or inserted from or into the drop/insert units (D/I) 51 and 52. Each of the channel preselecting signals is formed by a combination of two bits, i.e., a1 and b1 or a2 and b2. In response to the channel preselecting signals, the channel selecting circuit 6 outputs, to the matrix switch 4, the channel selecting signals SEL1=(a1,b1) and SEL2=(a2,b2) for selecting the channels through which signals to be dropped or inserted are transmitted and, in addition, channel selecting signals SEL3=(a1,b2) and SEL4=(a2,b1) for selecting the channels through which no signal is to be dropped or inserted. Hereinafter, the channels through which signals to be dropped or inserted are transmitted are referred to as drop/insert channels, and the channels through which no signal is to be dropped or inserted are referred to as through-channels. It should be noted that each of the through-channel selecting signal SEL3 or SEL4 is formed by an inverted bit of the first bit of one of the preselecting signals and an inverted bit of the second bit of another one of the preselecting signals. This is important for selecting the through-channels by means of a simple circuit.

The output unit 7 includes a parallel-serial converter (P/X) 8 for converting the four 450 Mb/s parallel signals into a 1.8 Gb/s serial signal, and an electro-optic converter (E/O) 9.

In operation, the signals through the drop/insert channels CH1 and CH2 are input from the input unit 1 to the drop/insert units 51 and 52 and are dropped therefrom. The signals to be inserted are input from a control circuit (not shown in FIG. 4) into the drop/insert units 51 and 52 and inserted into the channels CH1 and CH2.

On the other hand, the signals passing through the through-channels CH3 and CH4 are transmitted directly to the output unit 7 without passing through the drop/insert unit 51 or 52.

The selection of the drop/insert channels CH1 and CH2 or the through-channels CH3 and CH4 is carried out by the channel selection circuit 6. Namely, in response to the channel preselecting signals (a1,b1) and (a2,b2) for preselecting the drop/insert channels, the channel selecting signals SEL1 to SEL4 are output from the channel selecting circuit 6 to the matrix switch 4 so as to control the through-channels CH3 and CH4. In other words, when the channel preselecting signals from the drop/insert units 51 and 52 are (a1,b1) and (a2,b2), the channel selecting circuit 6 generates the channel selecting signals SEL3(a3',b3')=a1,b2) and SEL4(a4',b4')=(a2,b1) for selecting the through-channels.

Figure 5:
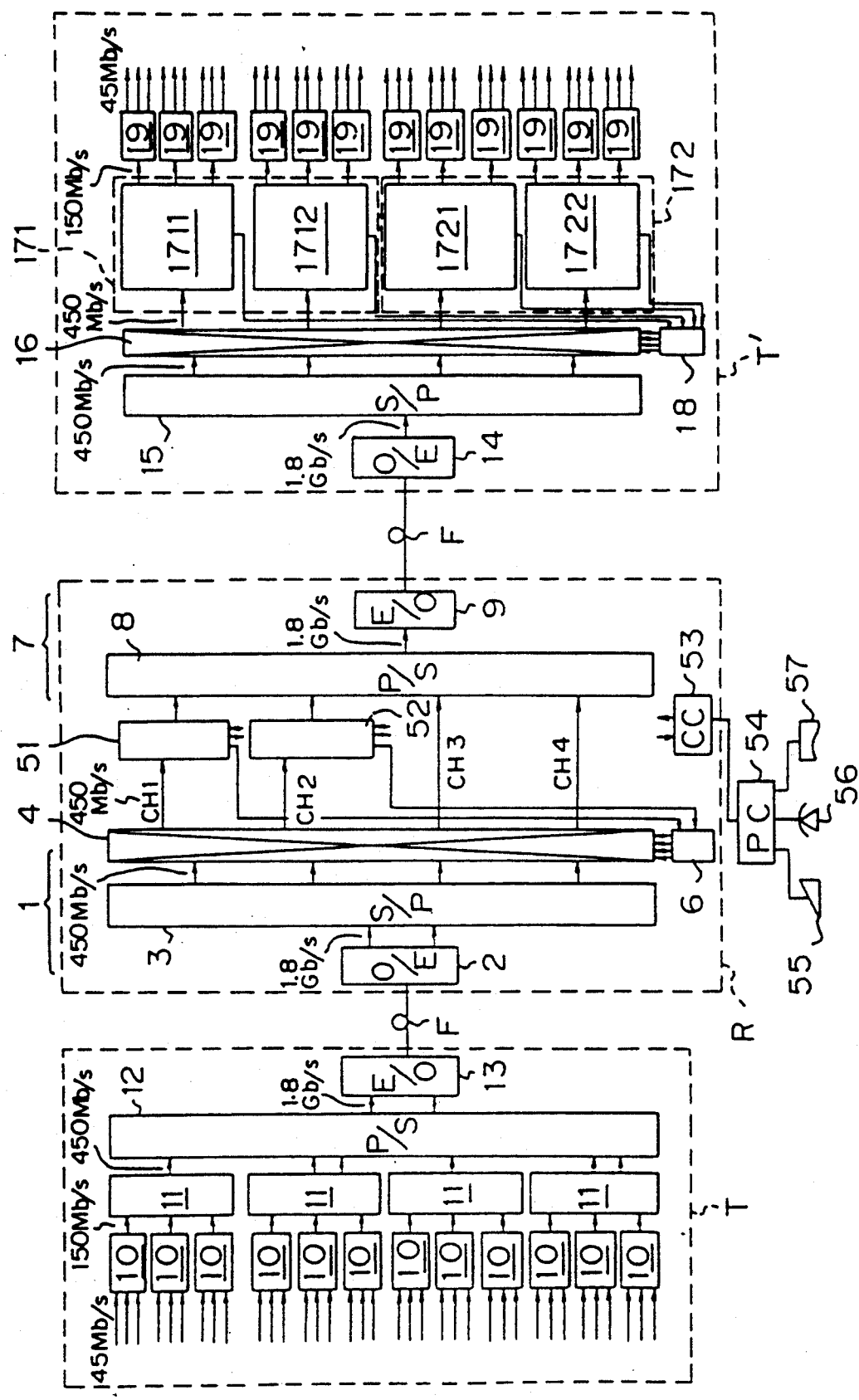
FIG. 5 is a block diagram showing the optical transmission system employing the intermediate repeater shown in FIG. 4 according to an embodiment of the present invention.

FIG. 5 is a block diagram showing an optical transmission system including the D/I repeater according to an embodiment of the present invention. In the figure, a transmitting line terminal equipment T and a D/I repeater R are connected through an optical fiber F. Also, the D/I repeater R and a receiving side line terminal equipment T' are connected through another optical fiber F.

The transmitting line terminal equipment T includes a plurality of multiplexers 10 each for multiplexing three lines of 45 Mb/s to a 150 Mb/s, four multiplexers 11 each for multiplexing three lines of 150 1 Mb/s to a 450 Mb/s, a parallel to serial converter (P/S) 12 for converting the four parallel 450 Mb/s signals into a 1.8 Gb/s signal, and an electro-optic converter (O/E) 13 for converting the 1.8 Gb/s signal into an optical signal.

The construction of the D/I repeater R is substantially the same as that shown in FIG. 4. In FIG. 5, the D/I repeater R includes a central control unit (CC) 53 which is connected to a personal computer IPC) 54 to which a data terminal 55, a telephone terminal 56, a printer 57 and the like are connected. The drop/insert units 51 and 52 each has a multiplexer and a demultiplexer arranged back to back as shown in FIG. 3. From the D/I units 51 and 52, channel preselecting signals (a1,b1) and (a2,b2) for preselecting the drop/insert channels are output to the channel selecting circuit 6.

The receiving line terminal equipment T' includes an opto-electric converter (O/E) 14 for converting the 1.8 Gb/s optical signal from the intermediate repeater R into a 1.8 Gb/s electric signal, a serial to parallel converter, a matrix switch 16, demultiplexers 171 and 172 including four demultiplexers 1711, 1712, 1721, and 1722 each for demultiplexing a 450 Mb/s signal into three 150 Mb/s, a channel selecting circuit 18, and a plurality of demultiplexers 19 each for demultiplexing the 150 Mb/s signal into 45 Mb/s signals.

Figure 6:
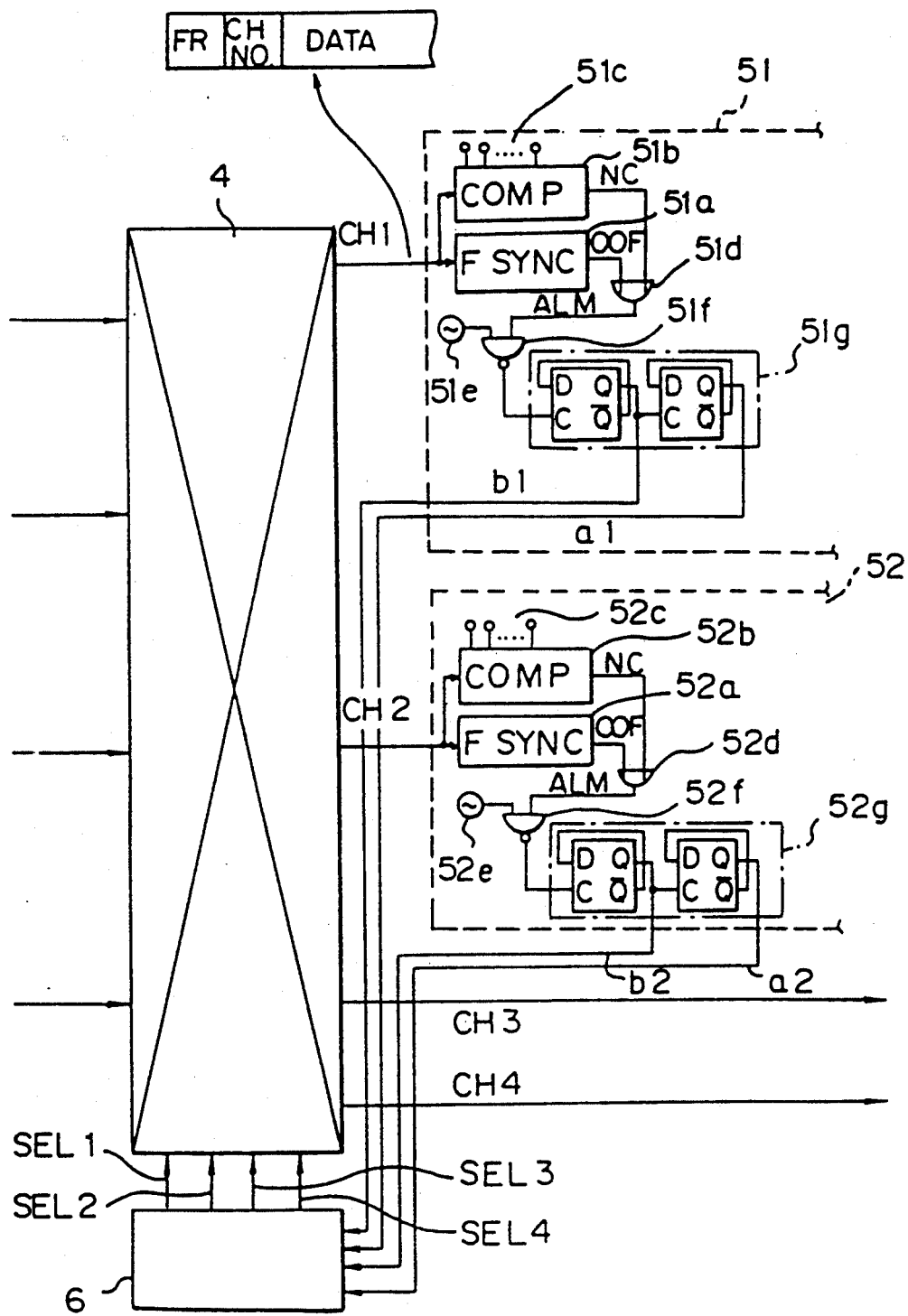
FIG. 6 is a block diagram showing an example of the constitution of a channel selecting circuit in each of the D/I units shown in FIG. 5.

FIG. 6 is a block diagram showing the construction of the D/I units 51 and 52 in the intermediate repeater R shown in FIG. 5. In the figure, the D/I units 51 and 52 respectively include frame synchronization detecting parts 51a and 52a, channel number comparing parts 51b and 52b for comparing channel numbers previously set from setting terminals 51c and 52c with channel numbers in the received channels from the matrix switch 4, OR gates 51a and 52d for gating the outputs of the frame synchronization detecting parts 51a and 52a and the comparing parts 51a and 52b, oscillators 51e and 52e, NAND gates 51f and 52f, and one-fourth frequency dividing circuits 51g and 52g.

The frame synchronization detecting part 51a previously outputs an Out Of Frame signal OOF when it can not find a frame synchronizing signal FR in the channel received from the matrix switch 4. The channel number comparing part 51b outputs a discord signal NC when the channel number in the received channel does not coincide with the previously stored channel number. When at least one of the Out Of Frame signal OOF and the non-coincide signal NC is output, it si gated through the OR gate 51d to be output as an alarm signal ALM. While the alarm signal ALM is being generated, the output of the oscillator 51e is gated through the NAND gate 51f. The clock-signal clock oscillator 51e outputs a clock signal of about several KHz to the NAND gate 51f. the frequency of the oscillator 51e is determined by the maximum time required to detect a frame. The maximum time for detecting the frame is referred to as a Maximum Average Reframing Time MART, and in this example, it is about 70 $\mu$ seconds.

The output of the NAND gate 51f is input to the one-fourth frequency dividing circuit 51g. The frequency dividing circuit 51g includes two dividing stages. From the two dividing stages, a 2-bit channel preselecting signal (a1,b1) is output for selecting a channel to be dropped or to be inserted.

The circuit construction of the D/I unit 52 is the same as the D/I unit 51 described above. The parts corresponding to the parts 51a to 51g are denoted by 52a to 52g. From the two stages in the frequency divider 52g, a 2-bit channel preselecting signal (a2,b2) is output for selecting a channel to be dropped or to be inserted.

The channel selecting circuit 6 receives, from the D/I units 51 and 52, the channel preselecting signals (a1,b1) and (a2,b2) for preselecting the channels to be dropped and to be inserted, and generates the same channel selecting signals SEL1(a1',b1')=(a1,b1) and SEL2-(a2',b2')=(a2,b2) for selecting the input channels to be dropped and to be inserted, and also generates the other channel selecting signals SEL3(a3',b3')=(a1,b2) and SEL4(a4',b4')=(a2,b1) for selecting the channels not to be dropped and to be inserted. These selecting signals SEL1 to SEL4 are applied to the matrix switch 4.

Figure 7:
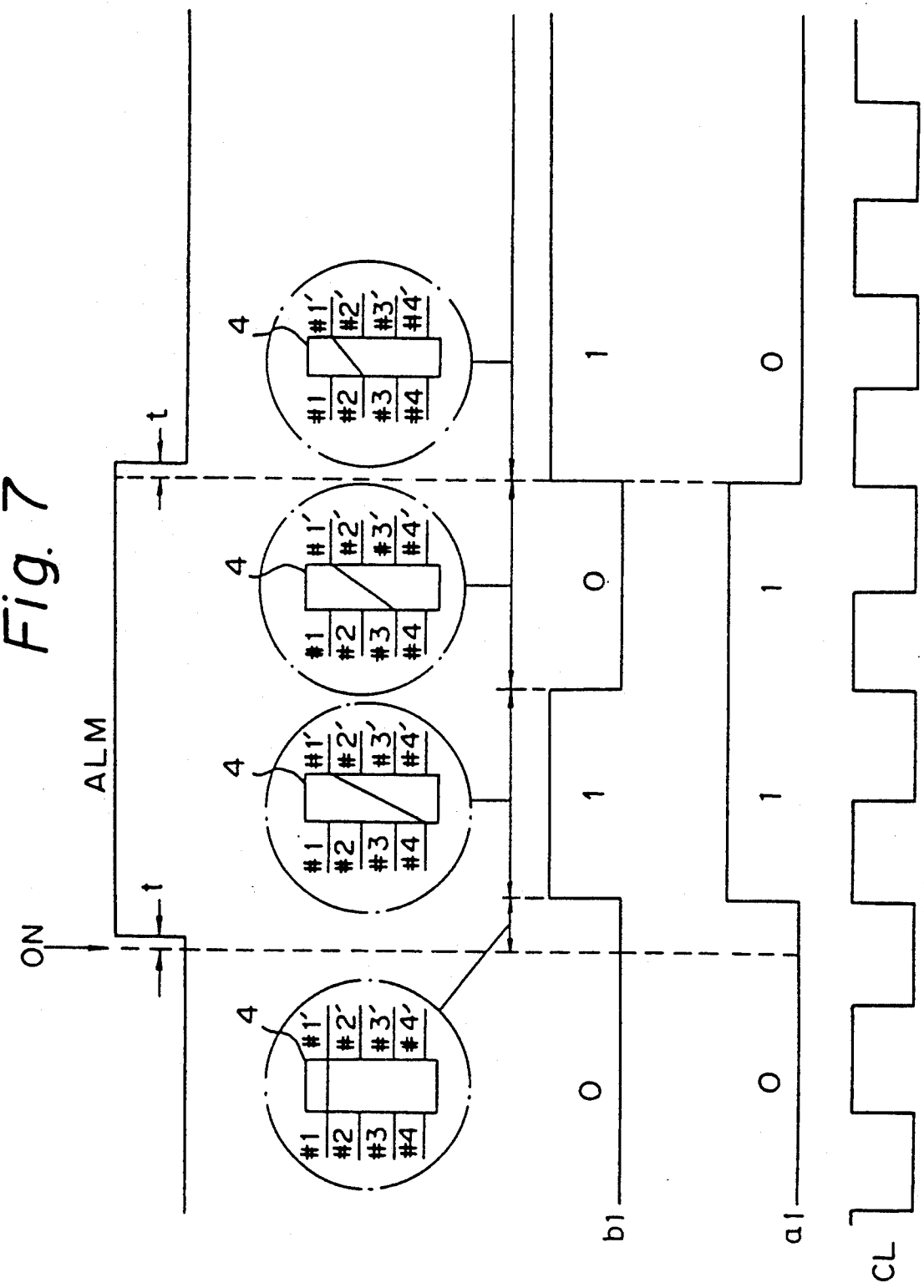
FIG. 7 is a diagram for explaining the channel selecting operation in response to the channel selecting signal shown in FIG. 6.

FIG. 7 is a diagram showing an example of an operation of the D/I unit 51 shown in FIG. 6. In FIG. 7, the matrix switch 4 has four input terminals #1 to #4 and four output terminals #1' to #4'. It is assumed that the first output terminal #1' is at first connected to the first input terminal #1 to which the input channel of the channel number #1 is connected in response to the channel selecting signal (a1',b1')=)0,0). It is also assumed that the channel number #2 is previously stored in the channel number comparing part 51b. Then, when the power of the D/I repeater R is turned ON, since the channel number #1 does not coincide with the previously stored channel number #2, an alarm signal ALM indicating an out of frame synchronization state is output from the NAND-gate 51f. In response to the alarm signal ALM, the one-fourth frequency divider 51a generates a channel preselecting signal (a1,b1). The signal b1 has one-half the frequency of the clock signal CL. The signal a1 has one-fourth the frequency of the clock signal CL. The channel selecting signal is at first turned from (0,0) to (1,1). In response to this channel selecting signal (1,1), the output of the matrix switch 4 is connected to the input channel number #2. Therefore, the alarm signal ALM does not disappear. The channel selecting signal is then turned from (1,1) to (1,0) so that the output of the matrix switch 4 is connected to the input channel of the channel number #3. The channel number #3 also does not coincide with the previously stored channel number #2. Therefore, the alarm signal also does not disappear. When the channel selecting signal then becomes (a1,b1)=(0,1) so that the output of the matrix switch 4 is connected to the input channel of the channel number #2, the channel number #2 coincides with the previously stored channel number #2, and therefore, the alarm signal ALM disappears. When the alarm signal ALM disappears, the signal on the channel of the channel number #2 is input to the D/I unit 51.

Similarly to the second, third, and fourth output terminals #2′,#3′, and #4′, the input channels #1 to #4 are connected sequentially in response to the channel selecting signals (a1′,b1′), (a2′,b2′), (a3′,b3′), and (a4′,b4′).

The operation of another C/I unit 52 is quite similar to that of the D/I unit 51 described above, and the description thereof is omitted here.

FIG. 8 is a diagram showing all combinations of the channel selecting signals SEL1(a1′,b1′), 2(a2′,b2′), 3(a3′,b3′), and 4(a4′,b4′). As will be seen from FIG. 8, when (a1′,b1′)=(0,0), then (a2′,b2′) may be (0,0), (0,1), (1,0), or (1,1); (a3′,b3′) may be (1,1), (1,0), (1,1), or (1,1); and (a4′,b4′) may be (1,1), (1,1), (0,1), or (0,1), respectively. The channel selecting signals (0,0), (0,1), (1,0), and (1,1) respectively select the input channels #1, #2, #3, and #4 to be connected to the output terminals of the matrix switch 4. For the channel selecting signal (a1′,b1′)=(0,1), (1,0), or (1,1), there are also four combinations of each of the other channel selecting signals (a2′,b2′), (a3′,b3′), and (a4′,b4′). Note that, for the combinations of the channel selecting signals marked by ※, there are the same channel selecting signals for the different channels. This means that the same input channel is connected to different output channels in the matrix switch 4. This causes an indefinite operation of the D/I units and abnormal operation with respect to the through-channels. These indefinite or abnormal operations, however, also occur even when the other channels selecting system is employed. Such an indefinite or abnormal operation can be detected at a line terminal equipment and the like be detecting an out of frame signal OOF. Therefore, the combinations of he channel selecting signals marked by    do not cause any problem.

Figure 9:
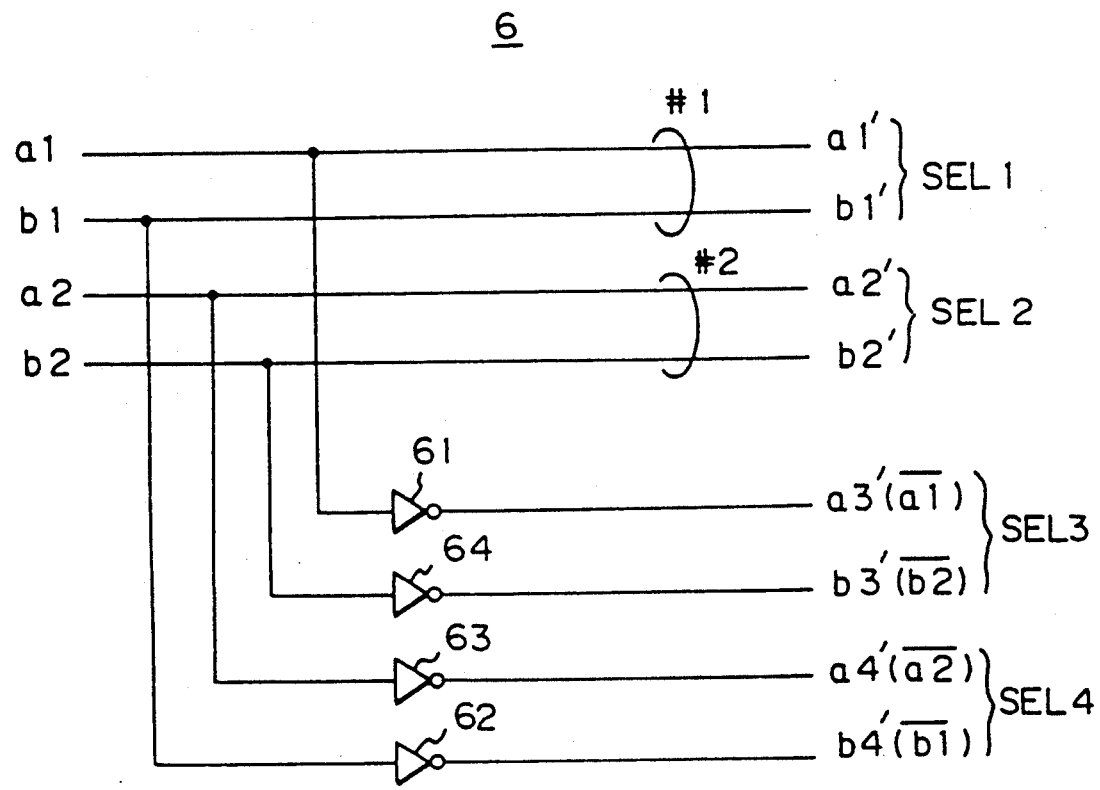
FIG. 9 is a circuit diagram of an example of the channel selecting circuit shown in FIG. 6, according to an embodiment of the present invention.

FIG. 9 is a circuit diagram showing an example of the channel selecting circuit wherein the output channels CH3 and CH4 are fixed to be through-channels. In the figure, the channel selecting circuit 6 includes four signal lines for directly passing the channel preselecting signals (a1,b1) and (a2,b2) for selecting the input channels #1 and #2 to be dropped or to be inserted to output the channel selecting signals SEL1(a1′, b1′) and SEL2-(a2′,b2′), and four NOT circuits 61 to 64 for inverting the codes of the signals on the respective signal lines. By this construction, the channel selecting signal SEL3-(a3′,b3′) is determined as (a1,b2) and the channel selecting signal SEL4(a4′,b4′) is determined as (a2,b1). Namely, the first bit a1 in the channel preselecting signal (a1,b1) is inverted by the NOT circuit 61 to output the first bit a3′ in the third channel selecting signal SEL3(a3′,b3′); the second bit b1 in the channel preselecting signal (a1,b1) is inverted by the NOT circuit 62 to output the second bit b4′in the fourth channel selecting signal SEL4(a4′,b4′); the first bit a2 in the channel preselecting signal (a2,b2) is inverted by the NOT circuit 63 to output the first bit a4′ in the fourth channel selecting signal SEL4(a4′,b4′); and the second bit b2 in the channel preselecting signal (a2,b2) is inverted by the NOT circuit 64 to output the second bit b3′ in the third channel selecting signal SEL3(a3′,b3′).

Since the channel selecting signals for selecting the through-channels can be determined by the use of only the channel selecting signals for selecting the drop/insert channels, the channel selecting circuit 6 can be formed by a small scale circuit of only two or three ICs.

Figure 10:
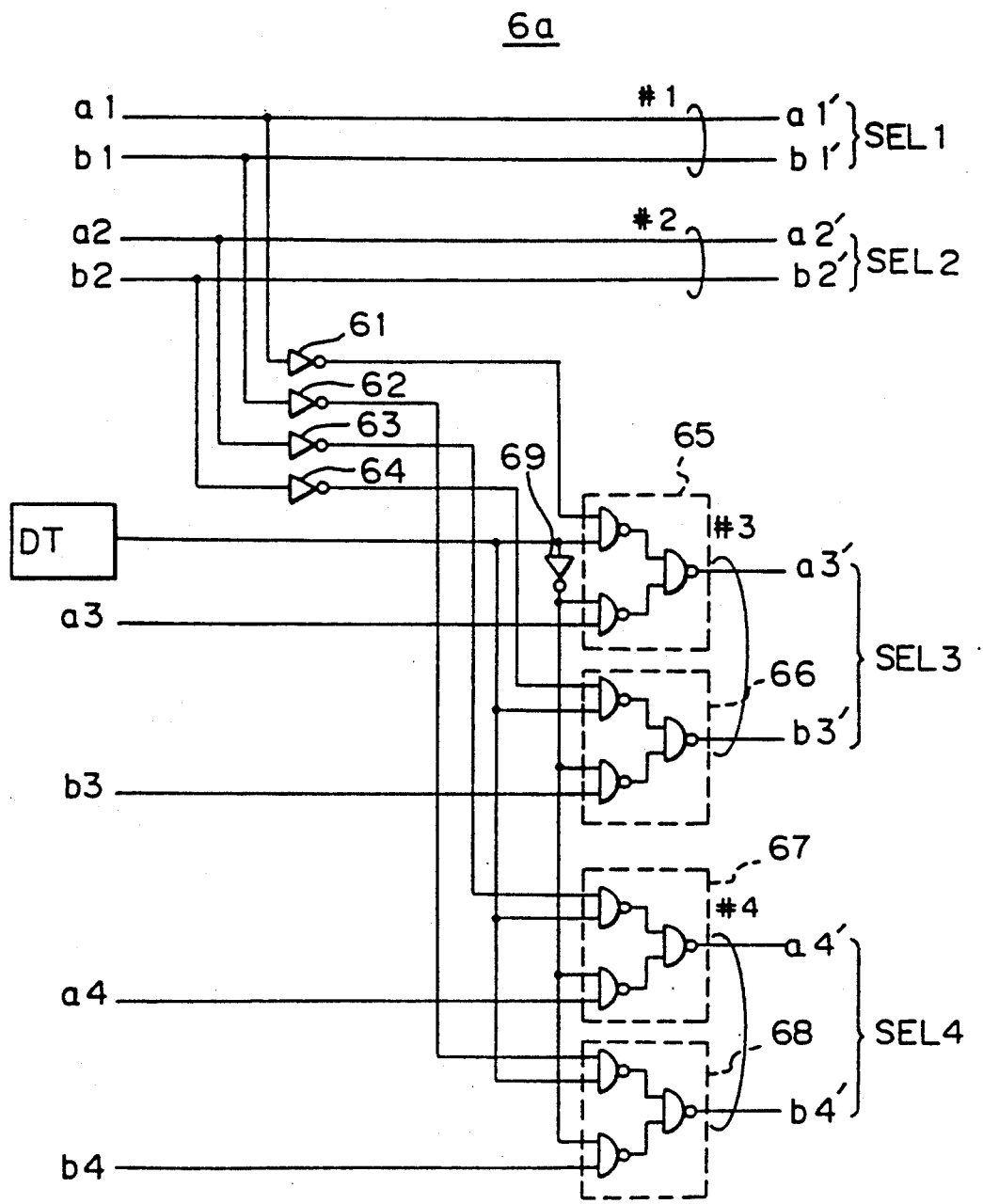
FIG. 10 is a circuit diagram of another example of the channel selecting circuit shown in FIG. 6, according to an embodiment of the present invention.

FIG. 10 is a circuit diagram of a channel selecting circuit according to another embodiment of the present invention in which a part of the channels are selectively used as through-channels or drop/insert channels. In the figure, a channel selecting circuit 6a includes four gate circuits 65 to 68 each consisting of three NAND gates and a NOT gate 69, in addition to the two pair of signal lines for directly passing the channel selecting signals (a1,b1) and (a2,b2) as the channel selecting signals SEL1(a1′,b1′) and SEL2(a2′, b2′) and the four NOT circuits 61 to 64 in the circuit shown in FIG. 9. A D/I unit detecting signal DT represents whether or not D/I units corresponding to the channels CH3 and CH4 is mounted on the D/I repeater R. When no D/I unit corresponding to the channels CH3 and CH4 is mounted, the detecting signal DT is at a high level H, and when the D/I units corresponding to the channels CH3 and CH4 is mounted, the detecting signal DT is at a low level O.

When the detecting signal DT is at the high level H, the gate circuit 65 selects the output of the NOT circuit 61, i.e., al, as the first bit a3′ of the channel selecting signal SEL3; the gate circuit 66 selects the output of the NOT circuit 64; i.e., b2, as the second bit b3′ of the channel selecting signal SEL3; the gate circuit 67 selects the output of the NOT circuit 63 i.e., a2, as the first bit a4′ of the channel selecting signal SEL4; and the gate circuit 68 selects the output of the NOT circuit 62 i.e., b1, as the second bit b4′ of the channel selecting signal SEL4. As a result, in this case, the channel selecting signals SEL3 and the SEL4 are the same as those in the channel selecting circuit shown in FIG. 9.

When the detecting signal DT is at the low level L, the gate circuits 65 and 66 select the channel selecting signal (a3, b3) from the additional D/I units; and the gate circuits 67 and 68 select the channel selecting signal (a4, b4) from the additional D/I units.

The additional D/I units are used in a repeater which has no through-channel. The switching NOT gate 69 and the gate circuits 65 to 68 are provided for selecting the channel selecting signals SEL3 and SEL4 to be (a1,b2) and (a2,b1) or (a3,b3) and (a4,b4) as described above. Namely, in the repeater which has no through-channel, there may be further provided two drop/insert units corresponding to the two output channels CH3 and CH4 of the matrix switch 4 so that all of the channels are dropped and inserted. Each of the additional D/I units has the same constructions as the D/I unit 51 or 52 except for the previously stored channel number. A channel selecting signal SEL3(a3′,b3′) is the output of one of the additional D/I unit (not shown in FIG. 10 but may be connected to the output channel CH3 of the matrix switch 4). A channel selecting signal SEL4-(a4′,b4′) is the output of another one of the additional D/I unit (not shown in FIG. 10 but may be connected to the output CH4 of the matrix switch 4). When the additional D/I units are plugged into the system, the detecting signal DT becomes the low level L. In contrast, when the additional D/I units are not plugged into the system, a detecting signal DT becomes the high level H. Whereby, when the above mentioned additional D/I units are not plugged into the system, the gate circuits 65 to 68 select the through-channel selecting signals SEL3(a3',b3')=(a1,b2) and SEL4(a4',b4')=(a2,b1) which are obtained by inverting the channel selecting signals (a1,b1) and (a2,b2) by the NOT gates 61 to 64; whereas when the above mentioned additional D/I units are plugged into the system, the gate circuits 65 to 67 select the channel selecting signals SEL3-(a3',b3')=(a3,b3) and SEL4(a4',b4')=(a4, b4) which are obtained directly from the additional D/I units or the demultiplexers.

Figure 11:
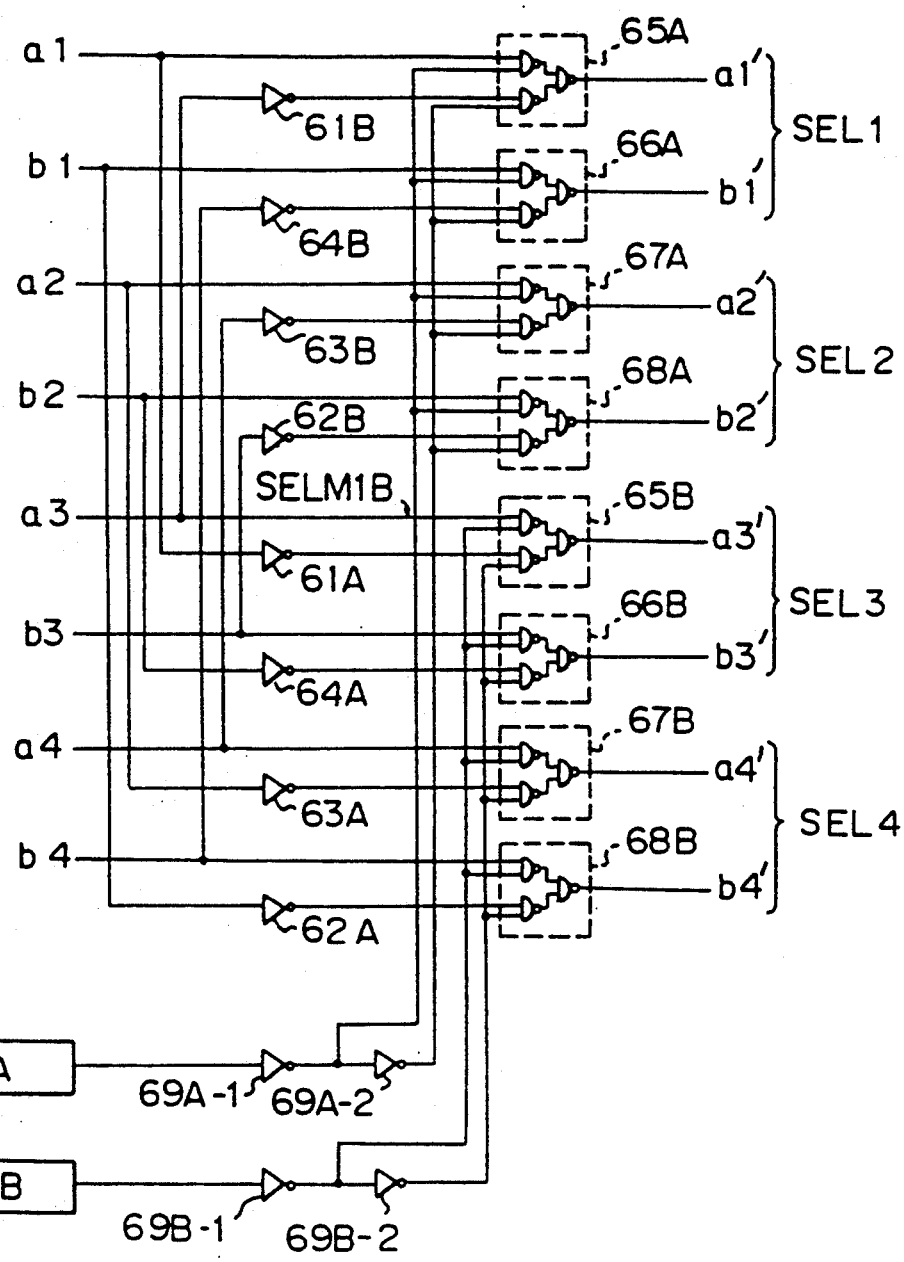
FIG. 11 is a diagram showing a still another example of the channel selecting circuit shown in FIG. 6, according to an embodiment of the present invention.

FIG. 11 is a circuit diagram showing a general purpose channel selecting circuit according to still another embodiment of the present invention. In the above-described embodiments, the through-channels in the intermediate repeater are fixed to be the channels CH3 and CH4. The through-channels, however, may alternatively be any of the channels CH1, CH2, CH3, and CH4. The channel selecting circuit in this case is as shown in FIG. 11.

In FIG. 11, the general purpose channel selecting circuit 6b includes NOT circuits 61A to 64A and 61B to 64B for inverting the signal codes of the channel selecting signals (a1,b1), (a2,b2), (a3,b3), and (a4,b4) from the corresponding D/I units, gate circuits 65A to 68A and 65B to 68B each consisting of three NAND gates, and switching NOT gates 69A-1, 69A-2, 69B-1, and 69B-2.

There are three modes regarding whether or not the drop/insert units corresponding to the channels CH1 to CH4 are plugged into the system. Namely, in the first mode, all of the drop/insert units are plugged in; in the second mode, only the drop/insert units corresponding to the output channels CH1 and CH2 are plugged in and the drop/insert units corresponding to the output channels CH3 and CH4 are not plugged in; and in the third mode, only the drop/insert units corresponding to the output channels CH3 and CH4 are plugged in and the drop/insert units corresponding to the channels CH1 and CH2 are not plugged in.

In the first mode, the detecting signals DTA and DTB are both at the L level and therefore the output of the NOT circuits 69A-1 and 69B-1 are at the H level, so that the gate circuits 65A to 68A select the signals a1, b1, a2, and b2 as the channel selecting signals SEL1-(a1',b1') and SEL2(a2',b2'), and the gate circuits 65B to 68B select the signals a3,b3,a4 and b4 as the channel selecting signals SEL3(a3',b3') and SEL4(a4',b4'). As a result, the channel selecting signals SEL1 to SEL4 in this case are (a1,b1), (a2,b2), (a3,b3), and (a4,b4) from the D/I units, respectively.

In the second mode, the output of the NOT circuit 69A-1 and the output o the NOT circuit 69B-2 are at the H level so that the gate circuits 65A to 68A select the signals a1, b1, a2, and b2 as the channel selecting signals SEL1(A1',b1') and SEL2(a2',b2'), and the gate circuits 65B to 68B select the signals a1,b2,a2, and b1 as the signals SEL3(a3',b3') and SEL4(a4',b4'), respectively. As a result, the channel selecting signals SEL1 to SEL4 in this case are (a1, b1), (a2,b2), (a1,b2), and (a2,b1), respectively.

The above-mentioned first and second modes are the same as the previously described embodiment.

In the third mode, the output of the NOT circuit 69A-2 and the output of the NOT circuit 69B-1 are at the H level so that the gate circuits 65A to 68A select the signals a3, b4, a4, and b3 as the channel selecting signals SEL1(a1',b1') and SEL2(a2',b2'), and the gate circuits 65B to 68B select the signals a3, b3, a4, and b4 as the channel selecting signals SEL3(a3',b3') and SEL4(a4',b4'), respectively. As a result, the channel selecting signals SEL1 to SEL4 in this case are (a3, b4), (a4, b3), (a3, b3), and (a4, b4), respectively.

The above-described embodiments of the channel selecting circuits shown in FIGS. 10 and 11 can be applied not only to the intermediate repeater but also to the receiving line terminal equipment T'. Therefore, both the receiving line terminal equipment and the intermediate repeater can employ the same channel selecting circuit. Note, however, that, in the receiving line terminal equipment T', demultiplexers are used in place of the D/I units in the intermediate repeater R. The D/I units and the demultiplexers are common in their multiplexing function. Since the channel selecting circuit int he receiving line terminal equipment and in the intermediate repeater can be manufactured as the same circuit configuration with the same design specification, the cost for implementing an optical transmission system can be reduced in, for example, the design cost or in the manufacturing cost of the repeaters. Further, when the channel selecting circuits are made the same, the number of kinds of standby units of the repeaters can be reduced so that the management becomes easy.

In the above-described embodiment with reference to FIG. 11, the through-channel may be any one of the output channels CH1 to CH4. As a result, the insert/-drop operation between the line terminal equipment and the intermediate repeater can be effected flexibly, providing a great advantage in decreasing the design cost, the manufacturing cost, managing cost, and the like.

In the above described embodiments, after the drop-/insert channels and the through-channels are determined, if one or more of the channels received by the intermediate repeater or by the receiving line terminal equipment enters an out of frame synchronization state, or in other words an out of frame, due to a fault in the transmitting repeater or the transmitting line, external noises and the like so that the intermediate repeater R or the receiving repeater T' receives an incorrect channel, the intermediate repeater R or the receiving line terminal equipment T' searches the desired channel from all of the input channels. To this end, the intermediate repeater R or the receiving line terminal equipment T' carries out a switching operation for all the channels. By the switching operation, however, the correctly selected channels such as through-channels are also switched. As a result, even when a single input channel includes a fault, all of the channels in the whole system become disconnected. Therefore, the above-described embodiments still have a low system reliability.

In the following, a still further embodiment of the present invention is described. An object of this embodiment of the present invention is to prevent the disconnected states of the all channels even when a single channel has a fault and to raise the system reliability. To attain this object, according to this embodiment, briefly, when a channel is not correctly received by an intermediate repeater or a receiving line terminal equipment, the channel is switched to another channel in the matrix switch, while the through-channels are fixed so as not to be switched.

Figure 12:
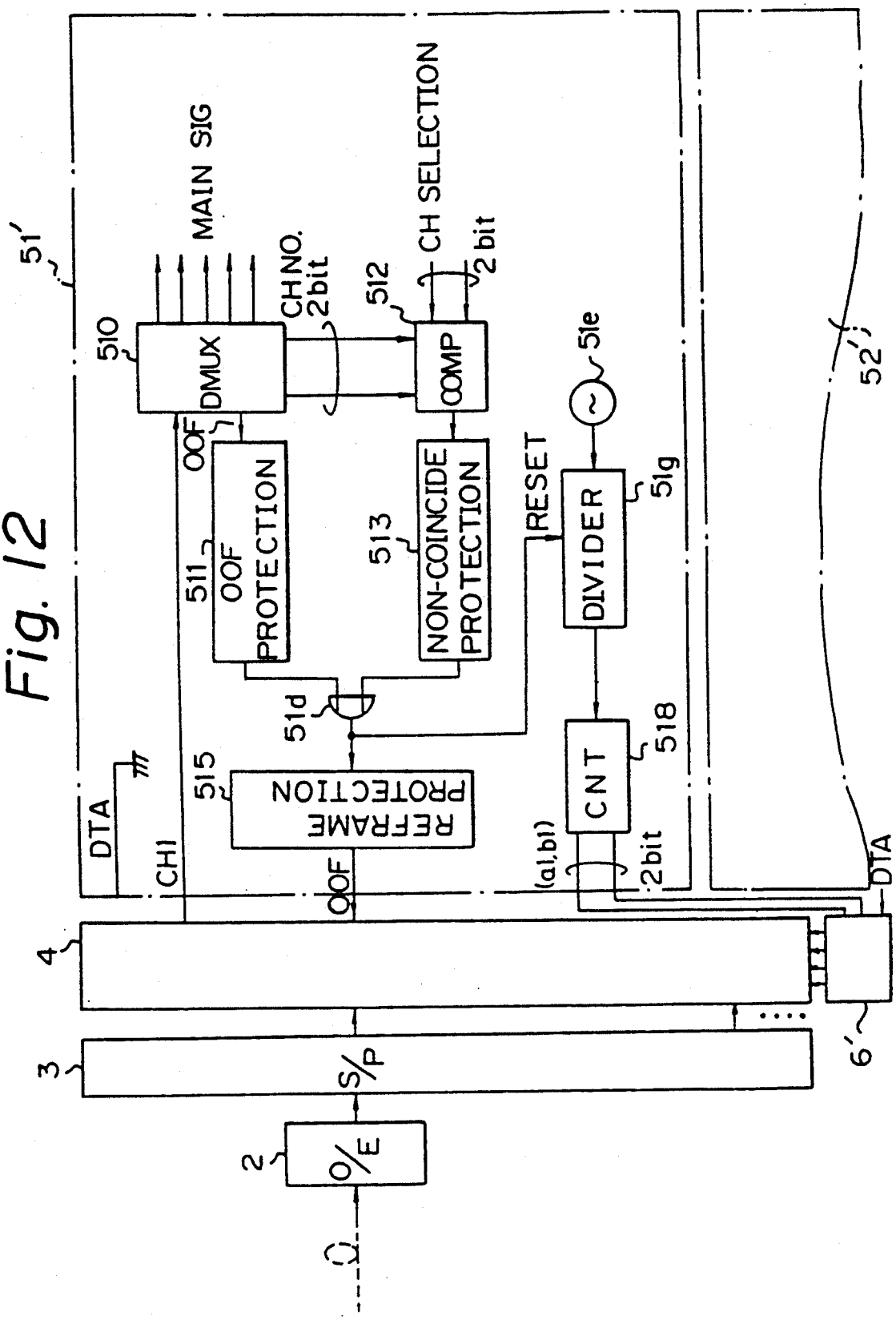
FIG. 12 is a block diagram showing another example of the constitution of a D/I unit shown in FIG. 6, according to an embodiment of the present invention.

FIG. 12 is a block diagram showing a D/I unit in an intermediate repeater according to this embodiment of the present invention. In the figure, the same parts as in the D/I unit 51 shown in FIG. 6 are denoted by the same reference symbols, and the parts corresponding to the parts shown in FIG. 6 are denoted by the same reference numbers with primes.

Namely, 51' is a D/I unit according to this embodiment. 510 is a demultiplexer for demultiplexing the signals passing through the channel CH1 output from the matrix switch 4 into a plurality of main signals. The demultiplexer 510 also detects an out of frame synchronization signal OOF and a 2-bit channel number in the channel CH1. 511 is an out of frame protecting circuit for effecting a front and rear protection of the out of frame synchronization signal OOF detected by the demultiplexer 510, 512 is a comparing circuit for detecting whether or not the received channel number from the demultiplexer 510 coincides with the previously stored 2-bit channel selection number, and 513 is a non-coincidence signal protection circuit for effecting a front and rear protection of the signal, representing that the received channel number does not coincide with the previously set channel selection number, detected by the comparing circuit 512. 51d is an OR circuit for obtaining a logical sum of the output signal of the out of frame protection circuit 511 and the output signal of the non-coincidence signal protecting circuit 513 to be output as an out of frame synchronization signal OOF, and 515 is a reframe protection circuit for effecting a rear protection of the output signal from the OR circuit 51d and for outputting the out of frame synchronization signal OOF to the matrix switch 4.

51e is a clock-signal oscillator. 51g is a frequency divider which is reset by the out of frame synchronization signal OOF from the OR circuit 51d. 518 is a counter for counting the maximum average reframing time MART multiplied by two after the reset and generates a 2-bit channel selecting signal. The 2-bit channel selecting signal applied to the counter 518 is output from the counter 518 after counting the MART and is applied to a channel selecting circuit 6'.

The demultiplexer 510 in FIG. 12 includes the frame synchronization detecting circuit 51a in the D/I unit 51 shown in FIG. 6. The constitution and the function of the comparing circuit 512 is the same as those of the comparing circuit 51b shown in FIG. 6.

The other D/I units 52', 53' and 54' have similar constitution as the D/I unit 51'.

When the D/I unit is inserted into the system, a detecting signal DTA of the L level is input to the channel selecting circuit 6'.

Figure 13:
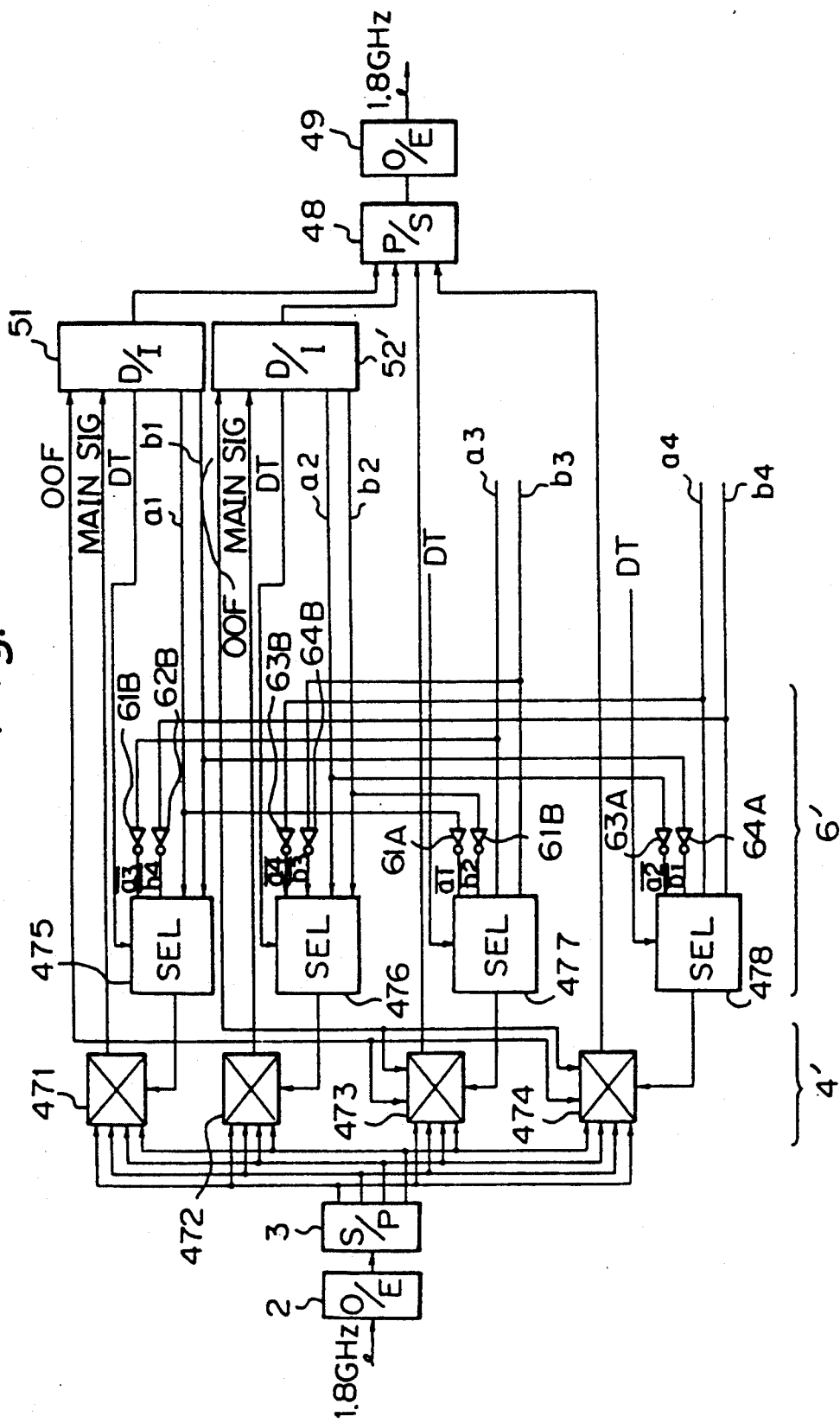
FIG. 13 is a circuit diagram showing another example of the construction of the matrix switch and the channel selecting circuit shown in FIG. 6, according to another embodiment of the present invention.

FIG. 13 is a block diagram showing the detailed construction of the matrix switch 4' and the channel selecting circuit 6' in the intermediate repeater R. In the figure, 471 to 474 are switching parts constituting the matrix switch 4'. The construction of the channel selecting circuit 6' is substantially the same as that shown in FIG. 11. Namely, 475 to 478 are channel selectors in the channel selecting circuit 6'. The channel selector 475 is formed by the logic circuits 65A and 66A shown in FIG. 11. Similarly, the channel selectors 476 to 478 are formed by the logic circuits 67A and 68A, 65B and 66B, and 67B and 68B, respectively. To the channel selectors 475 to 478, the inverting circuits 61B to 64B and 61A to 64A are connected in the same way as in FIG. 11. The out of frame synchronization signal OOF from the reframe protection unit 515 in the D/I unit 51' is applied to the switching parts 473 and 474 corresponding to the through-channels. Similarly, the signal OOF from the D/I unit 52' is also applied to the switching parts 473 and 474 corresponding to the through-channels. DT is a detection signal representing whether or no the corresponding D/I unit is mounted in the system. MAIN SIG is a main signal in the selected channel from the matrix switch 4'. Each of the switching parts 471 to 474 selects one of the four input channels input from the serial-parallel converter 3 and output it in accordance with the corresponding one of the selecting signals from the selecting parts 475 and 478. In addition, according to this embodiment of the present invention, when an out of frame synchronization signal OOF from the D/I unit 51' or 52' is received, the switching parts 473 and 474 corresponding to the through-channels fix their switching positions so as to continuously select the channels which are being selected, regardless of the channel selecting signals from the selecting parts 477 and 478.

In the matrix switch 4', the selection of the channel numbers of the through-channel at a normal state is carried out in the same way as in the before-described embodiment with reference to FIG. 11. Namely, in this case, no out of frame signal OOF is generated so that the switching parts 471 to 474 operate to select the channels in accordance with the channel selecting signals in the same way as described before.

By contrast, when an out of frame synchronization signal OOF is generated from either one of the D/I units 51' and 52' due to some hard error or soft error, the channel selection in the switching parts 473 and 474 corresponding to the through-channels are inhibited to sequentially select the channels but their output channels are fixed to the channels being selected at the time the signal OOF is applied, while the other switching parts 471 and 472 which do not correspond to the through-channels continue to select the input channels until the signal OOF disappears.

Assuming that a fault occurs in the multiplexer 11 (see FIG. 5) in the optical line terminal equipment T so that the channel CH1 enters a fault state, and that the D/I unit 51' in the optical intermediate repeater R expects the channel CH1 as a drop or insert channel, as a result, the D/I unit 51' cannot receive the channel CH1 in a normally synchronize state. Namely, the D/I unit 51' cannot detect the frame signal in the channel CH1 or cannot detect the channel number of the channel CH1. In this situation, the D/I unit 51' outputs the out of frame synchronization signal OOF after a predetermined protection time formed by the OOF protection circuit 511. The signal OOF is applied to the switching parts 473 and 474 whereby the operations thereof are inhibited. Then the D/I unit 51' outputs a channel preselecting signal (a1,b1) to the channel selecting circuit 6' so as to receive other channels for searching the desired channel CH1. In response to the channel preselecting signal, the matrix switch 4' switches the output channels.

An operation of the device shown in FIGS. 12 and 13 is described in more detail with reference to FIGS. 14 and 15.

Figure 14:
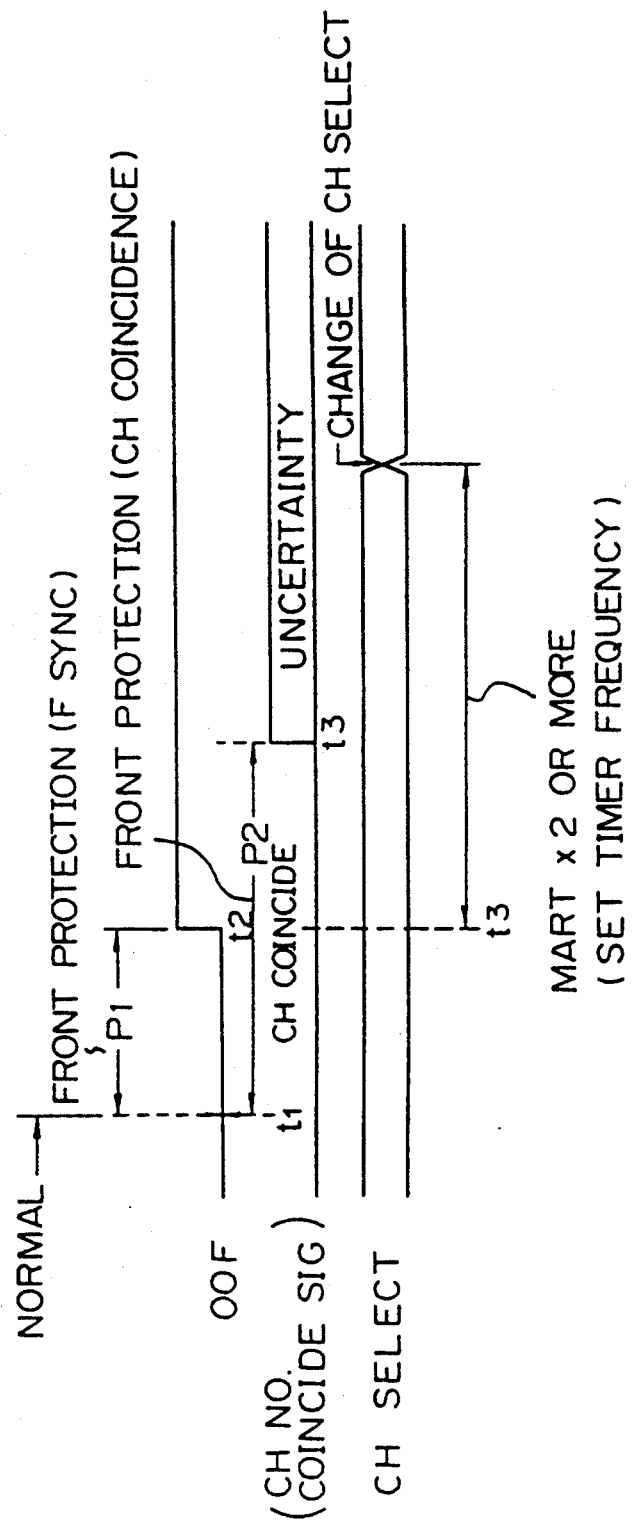
FIG. 14 is a timechart for explaining an operation from an out of frame synchronization state to a channel selection in the circuit shown in FIG. 12, according to an embodiment of the present invention.

FIG. 14 is a diagram for explaining the output timing of the channel selecting signal and the out of frame synchronization signal OOF. In the figure, before a time t1, the channel CH1 is in a normal state so that the OOF signal at the output of the demultiplexer 510 is at the low level L. When a fault occurs in the channel CH1 at a time t1, an OOF signal is applied from the demultiplexer 510 to the OOF protection circuit 511. The OOF protection circuit 511 is provided because there is a possibility that the OFF signal will disappear within a shot time. If the OFF signal disappears within a short time ad the normal state returns soon, the channel selection is not necessary. Therefore, to avoid the unnecessary selection of the channels, the OOF signal is output from the OOF protection circuit 511 at a time t2 after a predetermined front protection time p1 from the time t1. Here, the front protection means the ensurance time of the beginning of the OOF signal. At the same time t1, the comparing circuit 512 also detects that the channel number in the received channel does not coincide with the previously stored channel number. The non-coincidence signal protection circuit 513 also performs the front protection of the non-coincidence signal. As a result, at a time t3 after a predetermined protection time p2, the non-coincidence signal protection circuit 513 outputs a high level signal indicating that the channel number in the received channel is uncertain. The period p1 is selected to be shorter than the period p2 because the front protection of the non-coincidence usually requires a longer time., As a result, the OR circuit 51d outputs, at the time t2, the OOF signal which is then applied as a reset signal to the frequency divider 51e. The frequency divider 51a then counts to two times the MART by the use of the clock signal generator 51e. The output of the OR circuit 51d is also sent through the reframe protection circuit 515 to the matrix switch 4.

The channel selecting signal is changed after the two times of the MART after the time t2. Here, the worst average reframing time MART is the average time from the time when the received signal detects the out of frame synchronization state due to a bit error or external noises on a transmission line and the like during a normal state, to the time when a synchronized state is again recovered.

Namely, the out of frame synchronization signal OOF from the OR circuit 51d drives the frequency divider 51g so that the frequency of the clock signal from the clock-signal oscillator 51e is divided. The divided frequency signal is sent to the counter 518. The counter 518 outputs a channel selecting signal (a1,b1) to the channel selecting circuit 6' after counting the worst average reframe time by the use of the input clock signal.

In the matrix switch 4', the out of frame synchronization signal OOF is input to the switching parts 473 and 474, whereby the frames being selected by these switching parts 473 and 474 are fixed not to be switched. To the selecting parts 475 and 476, the channel selecting signals (a1,b1) and (a2,b2) are input at a time t4 after the MART has passed twice from the time t2 when the signal OOF is applied from the OR circuit 51d to the frequency divider 51g so as to change the channel selecting signals at the output of the selecting parts 475 and 476, whereby the switching parts 471 and 472 select the other channels and send them to the D/I units 51' and 52'. The switching parts 473 and 474 fix their outputs as the through-channels so that the channel selecting is not carried out.

Next, an explanation of the operation of the optical intermediate repeater R is given for the case when the through-channel CH1 is reframed or recovered from its fault state.

Figure 15:
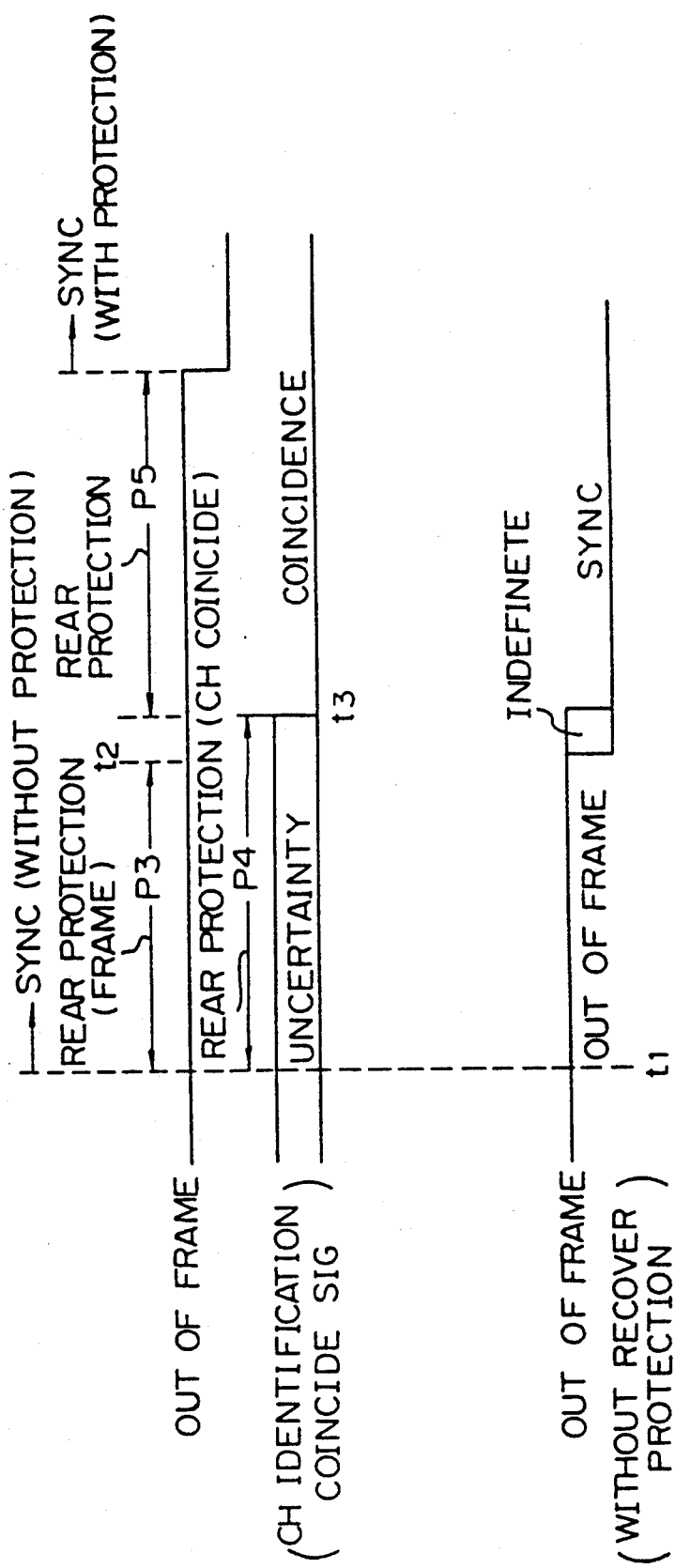
FIG. 15 is a timechart for explaining a reframe operation in the circuit shown in FIG. 12, according to an embodiment of the present invention.

FIG. 15 is a time chart for explaining the reframe process from the out of frame state.

In FIG. 15, when the channel CH1 becomes normal at a time t1, the demultiplexer 510 detects the frame synchronization signal FR in the received channel CH1 so as to output a frame detection signal which is the L level of the out of frame synchronization signal OOF to the out of frame protection circuit 511 which then turns the signal OOF at its output at a time t2 after a predetermined rear protection time p3 has passed. Here, the rear protection time p3 means the ensuring time of the fall of the signal OOF. Similarly, at the time t1, the comparing circuit 512 detects a coincidence of the channel number of the channel CH1 with the previously stored channel number so as to drive the non-coincidence signal protection circuit 5123 which then stops, at a time t3, to provide its output signal after a predetermined rear protection time p4 has passed. Therefore, the out of frame synchronization signal OOF output from the OR circuit 51d is turned off only after both of the output signals from the frame synchronization protection circuit 51 and the non-coincidence signal protection circuit 513 are turned off. In the case of FIG. 15, it is the time t3. Further, the reframe protection circuit 515 turns off the out of frame synchronization signal OOF output to the matrix switch 4' only after a predetermined reframe protection time =has further passed.

The above-mentioned reframe protection time p5 is provided because the non-coincidence signal cannot correctly be obtained until the frame synchronization is stably established. Therefore, as shown in the lower portion in FIG. 15, the channel identification coincidence signal may be indefinite even after the frame synchronization protection time p3 has passed. This indefinite coincidence/non-coincidence signal may cause a disturbance of the operation of the matrix switch 4'. To avoid the disturbance, the reframe protection time p5 is further provided as shown in FIG. 15.

Various modifications are possible in implementing the present invention. For example, the present invention is not restricted to the optical communication system as in the above-described embodiments but may be applied to other communication systems. Further, the present invention may be applied not only to an intermediate repeater but also to a receiving line terminal equipment. When the present invention is applied to a receiving line terminal equipment, demultiplexing units should be used in place of the D/I units in the intermediate repeater. Still further, the present invention may employ, as the multiplexing system, a frequency divided multiplexing system, a wave length dividing multiplexing system, and the like.

INDUSTRIAL APPLICABILITY

As described in detail above, in the drop/insert channel selecting system according to the present invention, the channel selecting signal is expressed by a 2-bit signal (a,b). When subsignals on two specific channels are to be dropped or to be inserted in an intermediate repeater, the channel selecting signals for selecting the channels to be dropped or to be inserted are assumed to be (a1,b1) and (a2,b2), then the channel selecting signals for selecting the channels which are not to be dropped or inserted are calculated as (a2,b1) and (a1,b2). Accordingly, the conventional random logic circuit constructed by 20 to 30 ICs is not necessary, and through-channels can be selected by a small scale circuit with only 2 to 3 ICs. Further, according to the present invention, in a multiplexing transmission device, even when one line becomes faulty, all lines do not become faulty. Namely, as described above, since the channel selecting signals are switched after a sufficient protection time from the detection of the out of frame signal, and since the selecting parts corresponding to the through-channels are fixed so as not to change the channels, the main signal passing through the through-channels are not cut even when a signal OOF is detected in the other channels.

We claim:

1. A drop/insert selecting system for dropping or inserting signals from or into a plurality of channels passing between input channels and output channels, comprising:

drop/insert means, coupled to the output channels, for sequentially generating channel preselecting signals until a frame synchronization state is established and for dropping or inserting signals from or into a corresponding one of the output channels when the frame synchronization state is established;

channel selecting means for generating first and second groups of channel selecting signals in response to the channel preselecting signals; and switching means, having a plurality of input terminals coupled to the input channels and having first and second groups of output terminals, the first group of the output terminals operatively connected to said drop/insert means and the second group of the output terminals operatively connected to the corresponding output channels as through-channels without any connection to said drop/insert means, for selectively connecting each of the output terminals of the first group to one of the input terminals in response to the first group of the selecting signals and for selectively connecting each of the output terminals of the second group to one of the input terminals in response to the second group of the selecting signals.

2. A drop/insert selecting system as claimed in claim 1, wherein the plurality of input terminals comprise first, second, third and fourth input terminals;

wherein the plurality of output terminals comprise first and second output terminals of the second group and third and fourth output terminals of the first group;

wherein said drop/insert means comprises first and second drop/insert units, operatively connected to said first and said second output terminals, respectively; and wherein the through-channels comprise first and second through-channels, operatively connected to the third and the fourth output terminals, respectively.

3. A drop/insert selecting system as claimed in claim 2, wherein each of said drop/insert units comprises:

frame synchronization detecting means, operatively connected to a corresponding one of the output terminals, for outputting an out of frame signal upon detecting an out of frame synchronization state in the channel output from the corresponding output terminal;

comparing means, operatively connected to a corresponding one of the output terminals, for outputting a non-coincidence signal upon detecting non-coincidence between the corresponding output terminal and a previously stored channel number indicating the channel to be used for one of dropping and inserting the necessary signals; and preselecting signal generating means, operatively connected to said frame synchronization detecting means and said comparing means, for generating at least first and second bits of a first channel preselecting signal for selecting one of the input terminals to be connected to the output terminal connected to the drop/insert unit under consideration, the first and second bits being changed with a predetermined period until both the out of frame and the non-coincidence signals disappear.

4. A drop/insert selecting system as claimed in claim 3, further comprising:

an out of frame protection circuit, operatively connected to said frame synchronization detecting means, for effecting front and rear protection of the out of frame signal from said frame synchronization detecting means;

a non-coincidence signal protection circuit, operatively connected to said comparing means, for effecting front and rear protection of the non-coincidence signal from said comparing means; and a reframe protection circuit, operatively connected between the outputs of said out of frame protection circuit and said switching means, and between the output of said non-coincidence protection circuit and said switching means, for effecting a rear protection of the signal output from said out of frame protection circuit or said non-coincidence protection circuit.

5. A drop/insert selecting system as claimed in claim 3, wherein said preselecting signal generating means comprises:

clock signal generating means for generating a clock signal; and frequency dividing means, operatively connected to said clock signal generating means, to said frame synchronization detecting means, and to said comparing means, for generating the first and second bits in response to the clock signal until both of the out of frame signal and the non-coincidence signal disappear.

6. A drop/insert selecting system as claimed in claim 5, further comprising:

counter means, operatively connected to said frequency dividing means, for counting at least a maximum average reframing time from detection of an out of frame state.

7. A drop/insert selecting system as claimed in claim 2, wherein said channel selecting means comprises:

first and second pairs of lines, operatively connected to said first and said second drop/insert units, respectively, the first pair of lines for directly passing first and second bits of a first channel preselecting signal of the second group, output from said first drop/insert unit, to said switching means, as a first channel selecting signal of the first group and directly passing first and second bits of a second channel preselecting signal output from said second drop/insert unit, to said switching means, as a second channel selecting signal of the first group for selecting one of the input terminals to be connected to the first output terminal and another one of the input terminals to be connected to the second output terminal, respectively;

a first NOT gate for inverting the first bit of the first channel preselecting signal output a first bit of a third channel selecting signal of the second group for selecting one of the input terminals to be connected to the third output terminal;

a second NOT gate for inverting the second bit of the first channel preselecting signal to output a second bit of a fourth channel selecting signal of the second group for selecting one of the input terminals to be connected to the fourth output terminal;

a third NOT gate for inverting the first bit of the second channel preselecting signal to output a first bit of the fourth channel selecting signal; and a fourth NOT gate for inverting the second bit of the second channel preselecting signal to output a second bit of the third channel selecting signal.

8. A drop/insert selecting system as claimed in claim 7, wherein each of said drop/insert units comprises:

frame synchronization detecting means, operatively connected to a corresponding one of the output terminals, for outputting an out of frame signal upon detecting an out of frame synchronization state in the channel output from the corresponding output terminal;

comparing means, operatively connected to a corresponding one of the output terminals, for outputting a non-coincidence signal upon detecting non-coincidence between the channel number in the channel output from the corresponding output terminal and a previously stored channel number indicating the channel to be used for at least one of dropping and inserting the necessary signals; and preselecting signal generating means, operatively connected to said frame synchronization detecting means and said comparing means, for generating the bits of the first and second channel preselecting signals for selecting one of the input terminals to be connected to the output terminal connected to the drop/insert unit under consideration, the bits of the first and second preselecting signals being changed with a predetermined period until both the out of frame and the non-coincidence signals disappear.

9. A drop/insert selecting system as claimed in claim 8, further comprising:

an out of frame protection circuit, operatively connected to said frame synchronization detecting means, for effecting front and rear protection on the out of frame signal from said frame synchronization detecting means;

a non-coincidence signal protection circuit, operatively connected to said comparing means, for effecting front and rear protection of the non-coincidence signal from said comparing means; and a reframe protection circuit, operatively connected between the outputs of said out of frame protection circuit and said switching means, and between the output of said non-coincidence signal protection circuit and said switching means, for effecting front protection and rear protection of the signal output from said out of frame protection circuit or said non-coincidence signal protection circuit.

10. A drop/insert electing system as claimed in claim 8, wherein said preselecting signal generating means comprises:

clock signal generating means for generating a clock signal; and frequency dividing means, operatively connected to said clock signal generating means, to said frame synchronization detecting means, and to said comparing means, for generating the channel preselecting signals in response to the clock signal, the out of frame signal and the non-coincidence signal.

11. A drop/insert selecting system as claimed in claim 10, further comprising:

counter means, operatively connected to said frequency dividing means, for counting at least a maximum average reframing time from the detection of an out of frame state.

12. A drop/insert selecting system as claimed in claim 2, wherein said switching means comprises a first, second, third, and fourth switching parts arranged to correspond to said first drop/insert unit, said second drop/insert unit, said first through-channel, and said second through-channel, respectively;

wherein each of said switching parts having the plurality of input terminals and one of the output terminals connected to a corresponding one of said first drop/insert unit, said second drop/insert unit, said first through-channel, and said second through-channel;

wherein said third switching part and said fourth switching part having means to fix, when said first or said second drop/insert unit is in an out of frame synchronization state, their switching positions determining the through channels.

13. A drop/insert selecting system for dropping or inserting signals from or into a plurality of channels passing between input channels and output channels, at least one of which is selectively used as a through-channel or a drop/insert channel based on the presence of a number of drop/insert units plugged into the system, comprising:

drop/insert means, having at least a first drop/insert unit, each drop/insert unit of said drop insert means coupled to corresponding output channels, for sequentially generating channel preselecting signals until a frame synchronization state is established and for dropping or inserting signals from or into a corresponding one of the output channels when the frame synchronization state is established;

detecting means for generating a detecting signal indicating if said drop/insert means has presence of at least a second drop/insert unit coupled to corresponding output channels;

channel selecting means for generating a first set of at least one channel selecting signal in response to the channel preselecting signals and for generating a second set of at least one channel selecting signal in response to both the channel preselecting signals and the detecting signal;

switching means, having a plurality of input terminals coupled to the input channels and having a plurality of output terminals, at least one of the output terminals operatively connected to said drop/insert means and any remaining output terminals operatively connected to corresponding output channels as through-channels without any connection to said drop/insert means depending on the number of drop/insert units plugged into the system, for selectively connecting each of the output terminals to each of the input terminals in response to the selecting signals.

14. A drop/insert selecting system as claimed in claim 13, wherein said switching means comprises first, second, third and fourth input terminals and first, second, third and fourth output terminals;

wherein said drop/insert means comprises and second drop insert units, and third and fourth optional drop/insert units, operatively connected to the first, the second, the third, and the fourth output terminals, respectively, the third and the fourth optional drop/insert units being optionally plugged into said drop/insert selecting system; and wherein said detecting means comprises means for generating the detecting signal indicating that said third and said fourth drop/insert units are plugged into said drop/insert system.

15. A drop/insert selecting system as claimed in claim 14, wherein said channel selecting means comprises:

a first and second pair of lines, operatively connected to said first and said second drop/insert units, respectively, the first pair for directly passing first and second bits of a first channel preselecting signal, output from said first drop/insert unit, to said switching means, as a first channel selecting signal of the first set of channel selecting signals and directly passing first and second bits of a second channel preselecting signal output from said second drop/insert unit, to said switching means, as a second channel selecting signal of the first set of channel selecting signals for selecting one of the input terminals to be connected to the first output terminal and another input terminal to be connected to the second output terminal, respectively;

a first NOT gate for inverting the first bit of the first channel preselecting signal;

a second NOT gate for inverting the second bit of the first channel preselecting signal;

a third NOT gate for inverting the first bit of the second channel preselecting signal;

a fourth NOT gate for inverting the second bit of the second channel preselecting signal;

a first gate circuit having a first input connected to the output of said first NOT gate and a second input connected to a first bit of a third channel preselecting signal, for outputting, as a first bit of a third channel selecting signal of the second set of channel selecting signals, either the first bit of the third channel preselecting signal or the output of said first NOT gate, depending on whether the detecting signal indicates said third drop/insert unit si plugged into said drop/insert selecting system respectively;

a second gate circuit having a first input connected to the output of said fourth NOT gate and a second input connected to a second bit of the third channel preselecting signal, for outputting, as a second bit of the third channel selecting signal of the second set of channel selecting signals, either the second bit of the third channel preselecting signal or the output of said fourth NOT gate, depending on whether the detecting signal indicates said third drop/insert unit is plugged into said drop/insert selecting system respectively;

a third gate circuit having a first input connected to the output of said third NOT gate and a second input connected to a first bit of a fourth channel preselecting signal, for outputting, as a first bit of a fourth channel selecting signal of the second set of channel selecting signals, either the first bit of the fourth channel preselecting signal or the output of said third NOT gate, depending on whether the detecting signal indicates said fourth drop/insert unit is plugged into said drop/insert selecting system respectively; and a fourth gate circuit having a first input connected to the output of said second NOT gate and a second input connected to a second bit of the fourth channel preselecting signal, for outputting, as a second bit of the fourth channel selection signal of the second set of channel selecting signals, either the second bit of the fourth channel preselecting signal or the output of said second NOT gate, depending on whether the detecting signal indicates said fourth drop/insert until is plugged into said drop/insert selecting system respectively;

wherein the outputs of said first and said second gate circuits being the third channel selecting signal for selecting one of the input terminals of said switching means to be connected to the third output terminal of said switching means;

wherein the outputs of said third an said fourth gate circuits being the fourth channel selecting signal for selecting one of the input terminals of said switching means to be connected to the fourth output terminal of said switching means.

16. A drop/insert selecting system as claimed in claim 15, wherein each of said drop/insert units comprises:

frame synchronization detecting means, operatively connected to a corresponding one of the output terminals, for outputting an out of frame signal upon detecting an out of frame synchronization state in the channel output from the corresponding output terminal;

comparing means, operatively connected to a corresponding one of the output terminals, for outputting a non-coincidence signal upon detecting non-coincidence between the channel number in the channel output from the corresponding output terminal and a previously stored channel number indicating the channel to be used for one of dropping and inserting the necessary signals; and preselecting signal generating means, operatively connected to said frame synchronization detecting means and said comparing means, for generating the bits of the channel preselecting signals for selecting one of the input terminals to be connected to the output terminal connected to the drop/insert unit under consideration, the bits of the channel preselecting signals being changed with a predetermined period until both the out of frame and the non-coincidence signals disappear.

17. A drop/insert selecting system as claimed in claim 16, further comprising:

an out of frame protection circuit, operatively connected to said frame synchronization detecting mans, for effecting front and rear protection of the out of frame signal from said frame synchronization detecting means;

a non-coincidence signal protection circuit, operatively connected to said comparing means, for effecting front and rear protection of the non-coincidence signal from said comparing means; and a reframe protection circuit, operatively connected between the outputs of said out of frame protection circuit and said switching means, and between the output of said non-coincidence signal protection circuit and said switching means, for effecting a front protection and a rear protection of the signal output from said out of frame protection circuit or said non-coincidence signal protection circuit.

18. A drop/insert selecting system as claimed in claim 16, wherein said preselecting signal generating means comprises:

clock signal generating means for generating a clock signal; and frequency dividing means, operatively connected to said clock signal generating means, to said frame synchronization detecting means, and to said comparing means, for generating the preselecting signals in response to said clock signal until both of the out of frame signal and the non-coincidence signal disappear.

19. A drop/inset selecting system as claimed in claim 18, further comprising:

counter means, operatively connected to said frequency dividing means, for counting at least the maximum average reframing time from the detection of an out of frame state.

20. A drop/insert selecting system for dropping or inserting signals from or into a plurality of channels passing between input channels and output channels, at least one of which is selectively used as a through-channel or a drop/insert channel based on the presence of a number of drop/insert units plugged into the system, comprising:

drop/insert means, having at least a first drop/insert unit, each drop/insert unit of said drop/insert means coupled to corresponding output channels, for sequentially generating channel preselecting signals until a frame synchronization state is established and for dropping or inserting signals from or into a corresponding one of the output channels when the frame synchronization state is established;

detecting means for generating a detecting signal indicating if said drop/insert means has presence of at least a second drop/inset unit coupled to corresponding output channels;

channel selecting means for generating a plurality of channel selecting signals in response to both the channel preselecting signals and the detecting signal; and switching means, having a plurality of input terminals coupled to the input channels and having a plurality of output terminals, at least one of the output terminals operatively connected to said drop/insert means and any remaining output terminals operatively connected to corresponding output channels as through-channels without any connection to said drop/.insert means depending on the number of drop/insert units plugged into the system, for selectively connecting each of the output terminals to each of the input terminals in response to the selecting signals.

21. A drop/insert selecting system as claimed in claim 20, wherein said switching means comprises first, second, third an fourth input terminals and first, second, third an fourth output terminals;

wherein said drop/insert means comprises first, second, third and fourth optional drop/insert units, optionally plugged into said drop/insert selecting system, and operatively connected to the first, second, third and fourth output terminals, respectively, when plugged into said drop/insert selecting system; and wherein said detecting means comprises means for generating the detecting signal indicating whether said first, second, third and fourth drop/insert units are plugged into said drop/insert selecting system.

22. A drop/insert selecting system as claimed in claim 21, wherein each of said drop/insert units comprises:

frame synchronization detecting means, operatively connected to a corresponding one of the output terminals for outputting an out of frame signal upon detecting an out of frame synchronization state in the channel output from the corresponding output terminal;

comparing means, operatively connected to a corresponding one of the output terminals, for outputting a non-coincidence signal upon detecting non-coincidence between the channel number in the channel output from the corresponding output terminal and a previously stored channel number indicating the channel to be used for one of dropping and inserting the necessary signals; and preselecting signal generating means, operatively connected to said frame synchronization detecting means and said comparing means, for generating preselecting signals for selecting one of the input terminals to be connected to the output terminal connected to the drop/insert unit under consideration, the preselecting signals being changed with a predetermined period until both the out of frame and the non-coincidence signals disappear.

23. A drop/insert selecting system as claimed in claim 22, further comprising:

an out of frame protection circuit, operatively connected to said frame synchronization detecting means, for effecting front and rear protection on the out of frame signal from said frame synchronization detecting means;

a non-coincidence signal protection circuit, operatively connected to said comparing means, for effecting front and rear protection of the non-coincidence signal from said comparing means; and a reframe protection circuit, operatively connected between the outputs of said out of frame protection circuit and said switching means, and between the output of said non-coincidence signal protection circuit and said switching means, for effecting a front protection and a rear protection of the signal output from said out of frame protection circuit or said non-coincidence signal protection circuit.

24. A drop/insert selecting system as claimed in claim 22, wherein said preselecting signal generating means comprises:

clock signal generating means for generating a clock signal; and frequency dividing means, operatively connected to said clock signal generating means, to said frame synchronization detecting means, and to said comparing means, for generating the channel preselecting signals in response to the clock signal until both the out of frame signal and the non-coincidence signals disappear.

25. A drop/insert selecting system as claimed in claim 24, further comprising:

counter means, operatively connected to said frequency dividing means, for counting at least a maximum average reframing time from the detection of an out of frame state.

26. A drop/insert selecting system as claimed in claim 21, wherein said channel selecting means comprises:

a first NOT gate for inverting a first bit of a first channel preselecting signal;

a second NOT gate for inverting a second bit of the first channel preselecting signal;

a third NOT gate for inverting a first bit of a second channel preselecting signal;

a fourth NOT gate for inverting a second bit of the second channel preselecting signal;

a fifth NOT gate for inverting a first bit of a third channel preselecting signal;

a sixth NOT gate for inverting a second bit of the third channel preselecting signal;

a seventh NOT gate for inverting a first bit of a fourth channel preselecting signal;

an eighth NOT gate for inverting a second bit of the fourth channel preselecting signal;

a first gate circuit having a first input connected to the output of said first NOT gate and a second input connected to a first bit of the third channel preselecting signal, for outputting, as a first bit of a third channel selecting signal, either the first bit of the third channel preselecting signal or the output of said first NOT gate, depending on whether the detection signal indicates said third drop/insert unit is plugged into said drop/insert selecting system respectively;

a second gate circuit having a first input connected to the output of said fourth NOT gate and a second input connected to a second bit of the third channel selecting signal, for outputting, as a second bit of the third channel selecting signal, either the second bit of the third channel preselecting signal or the output of said fourth NOT gate, depending on whether the detecting signal indicates said third drop/insert unit is plugged into said drop/insert selecting system respectively;

a third gate circuit having a first input connected to the output of said third NOT gate and a second input connected to a first bit of the fourth channel preselecting signal, for outputting, as a first bit of a fourth channel selecting signal, either the first bit of the fourth channel preselecting signal or the output of said third NOT gate, depending on whether the detecting signal indicates said fourth drop/insert unit is plugged into said drop/insert selecting system respectively;

a fourth gate circuit having a first input connected to the output of said second NOT gate and a second input connected to a second bit of the fourth channel preselecting signal, for outputting, as a second bit of the fourth channel selecting signal, either the second bit of the fourth channel preselecting signal or the output of said second NOT gate, depending on whether the detecting signal indicates said fourth drop/insert unit is plugged into said drop/insert system selecting respectively;

a fifth gate circuit having a first input connected to the output of said fifth NOT gate and a second input connected to a first bit of the first channel preselecting signal, for outputting, as a first bit of a first channel selecting signal, either the first bit of the first channel preselecting signal or the output of said fifth NOT gate, depending on whether the detecting signal indicates said first drop/insert unit is plugged into said drop/insert selecting system respectively;

a sixth gate circuit having a first input connected to the output of said eighth NOT gate and a second input connected to a second bit of the first channel preselecting signal, for outputting, as a second bit of a first channel selecting signal, either the second bit of the first channel preselecting signal or the output of said eighth NOT gate, depending on whether the detecting signal indicates said first drop/insert unit is plugged into said drop/insert selecting system respectively;

a seventh gate circuit having a first input connected to the input of said seventh NOT gate and a second input connected to a first bit of the second channel preselecting signal, for outputting, as a first bit of a second channel selecting signal, either the first bit of the second channel preselecting signal or the output of said seventh NOT gate, depending on whether the detecting signal indicates said third drop/insert unit is plugged into said drop/insert system selecting respectively;

an eighth gate circuit having a first input connected to the output of said sixth NOT gate and a second input connected to a second bit of the second channel preselecting signal, for outputting, as a second bit of the second channel selecting signal, either the second bit of the second channel preselecting signal or the output of said sixth NOT gate, depending on whether the detecting signal indicates said fourth drop/insert unit is plugged into said drop/insert system selecting respectively;

wherein the outputs of said fifth and said sixth gate circuits being the first channel selecting signal for selecting one of the input terminals of said switching means to be connected to the first output terminal of said switching means;

wherein the outputs of said seventh and said eighth gate circuits being the second channel selecting signal for selecting one of the input terminals of said switching means to be connected to the second output terminal of said switching means;

wherein the outputs of said first and second gate circuits being the third channel selecting signal for selecting one of the input terminals of said switching means to be connected to the third output terminal of said switching means; and wherein the outputs of said third and said fourth gate circuits being the fourth channel selecting signal for selecting one of the input terminals of said switching means to be connected to the fourth output terminal of said switching means.

27. A drop/insert selecting system as claimed in claim 21, wherein said third optional drop/insert unit and said fourth optional drop/insert unit are unplugged and their corresponding output channels are first and second through-channels;

wherein said switching means comprises a first, second, third, and fourth switching parts arranged to correspond to said first drop/insert unit, said second drop/insert unit, said first through-channel, and said second through-channel, respectively;

wherein each of said switching parts having said plurality of input terminals and one of said output terminals connected to a corresponding one of said first drop/insert unit, said second drop/insert unit, said first through-channel, and said second through-channel; and wherein said third switching part and said fourth switching part having means to fix, when said first or said second drop/insert unit is in an out of frame synchronization state, their switching positions determining the through channels.

* * * * *

UNITED STATES PATENT AND TRADEMARK OFFICE
CERTIFICATE OF CORRECTION

PATENT NO. : 5,134,609

DATED : July 28, 1992

INVENTOR(S) : Mori et al.

It is certified that error appears in the above-identified patent and that said Letters Patent is hereby corrected as shown below:

Col. 4, line 59, "forty" should be --fourth--.

Col. 5, line 15, "i" should be --in--.

Col. 7, line 35, "1.81" should be --1.8--.

Col. 8, line 21, "a1.8" should be --1.8--;
line 26, after "have" insert --a--;
line 55, "(P/X)" should be --(P/S)--.

Col. 9, line 34, "IPC)" should be --(PC)--.

Col. 10, line 5, "si" should be --is--...;
line 55, "51a" should be --51g--;
line 62, after "channel" insert --of the channel number #4. The channel number #4 also does not coincide with the previously stored channel--.

Col. 11, line 40, "be" should be --by--;
line 42, after "by" insert -- ·⋇· --.

Col. 12, line 26, "O" should be --L--.

Col. 13, line 41, "output" should be --outputs--.

UNITED STATES PATENT AND TRADEMARK OFFICE
CERTIFICATE OF CORRECTION

PATENT NO. : 5,134,609

DATED : July 28, 1992

INVENTOR(S) : Mori et al.

It is certified that error appears in the above-identified patent and that said Letters Patent is hereby corrected as shown below:

Col. 14, line 16, "int he" should be --in the--.

Col. 17, line 19, "time.," should be --time--;
        line 22, "51a" should be --51g--;
        line 43, "nal" should be --nals--.

Col. 18, line 10, "5123" should be --513--.

Col. 19, (Claim 2), line 62, after "the" insert --channel number in the channel output from the--.

Col. 22, (Claim 14), line 66, after "comprises" insert --first--.

Col. 23, (Claim 15), line 43, "si" should be --is--.

Col. 24, (Claim 15), line 15, "an" should be --and--.

Col. 25, (Claim 19), line 13, "the" should be --a--;
        (Claim 21), lines 56 and 57, "an" should be --and--.

Col. 26, (Claim 23), line 30, "on" should be --of--.

Signed and Sealed this

Twenty-third Day of January, 1996

Attest:

BRUCE LEHMAN

Attesting Officer      Commissioner of Patents and Trademarks